(12) United States Patent
Mizuno

(10) Patent No.: US 8,280,862 B2
(45) Date of Patent: Oct. 2, 2012

(54) DIGITAL-CINEMA PROCESSING APPARATUS, INGESTING METHOD, AND PROGRAM

(75) Inventor: Hiroshi Mizuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 551 days.

(21) Appl. No.: 12/105,063

(22) Filed: Apr. 17, 2008

(65) Prior Publication Data

US 2008/0281872 A1 Nov. 13, 2008

(30) Foreign Application Priority Data

May 10, 2007 (JP) ................................. 2007-126011

(51) Int. Cl.
*G06F 7/00* (2006.01)
*G06F 17/00* (2006.01)

(52) U.S. Cl. ........................................ 707/693; 707/695

(58) Field of Classification Search ......................... None
See application file for complete search history.

(56) References Cited

U.S. PATENT DOCUMENTS

| | | | | |
|---|---|---|---|---|
| 6,141,530 A * | 10/2000 | Rabowsky | ..................... | 725/116 |
| 6,587,634 B2 * | 7/2003 | Maltz et al. | ..................... | 386/234 |
| 7,039,784 B1 * | 5/2006 | Chen et al. | ..................... | 711/170 |
| 2002/0156912 A1 * | 10/2002 | Hurst et al. | ..................... | 709/236 |
| 2003/0172149 A1 * | 9/2003 | Edsall et al. | ................... | 709/224 |
| 2004/0064702 A1 * | 4/2004 | Yu et al. | ........................ | 713/176 |
| 2006/0015927 A1 * | 1/2006 | Antonellis et al. | ............ | 725/145 |
| 2006/0136969 A1 * | 6/2006 | Patton et al. | ..................... | 725/78 |
| 2006/0177139 A1 * | 8/2006 | Marcellin et al. | ............. | 382/232 |
| 2006/0179126 A1 * | 8/2006 | Fujino et al. | .................. | 709/219 |
| 2007/0022439 A1 * | 1/2007 | Kim et al. | ....................... | 725/45 |

FOREIGN PATENT DOCUMENTS

| | | |
|---|---|---|
| JP | 2003-308252 | 10/2003 |
| JP | 2004-355342 | 12/2004 |

* cited by examiner

*Primary Examiner* — Pierre Vital
*Assistant Examiner* — Augustine K Obisesan
(74) *Attorney, Agent, or Firm* — Oblon, Spivak, McClelland, Maier & Neustadt, L.L.P.

(57) ABSTRACT

A digital-cinema processing apparatus for ingesting a digital cinema package (DCP) in a storage device includes a DCP obtaining unit configured obtain at least one divided DCP to be ingested among divided DCPs including a common asset map corresponding to a digital cinema, the divided DCPs having allocated thereto one or more picture track files, sound track files, and/or subtitle track files for the digital cinema; an asset-map-information extracting unit configured to extract asset map information from the asset map included in the divided DCP to be ingested, the asset map information being information unique to the asset map; a directory determining unit configured to determine an ingestion destination directory for the divided DCP in the storage device on the basis of the asset map information; and an ingesting unit configured to ingest the divided DCP in the ingestion destination directory of the storage device.

13 Claims, 20 Drawing Sheets

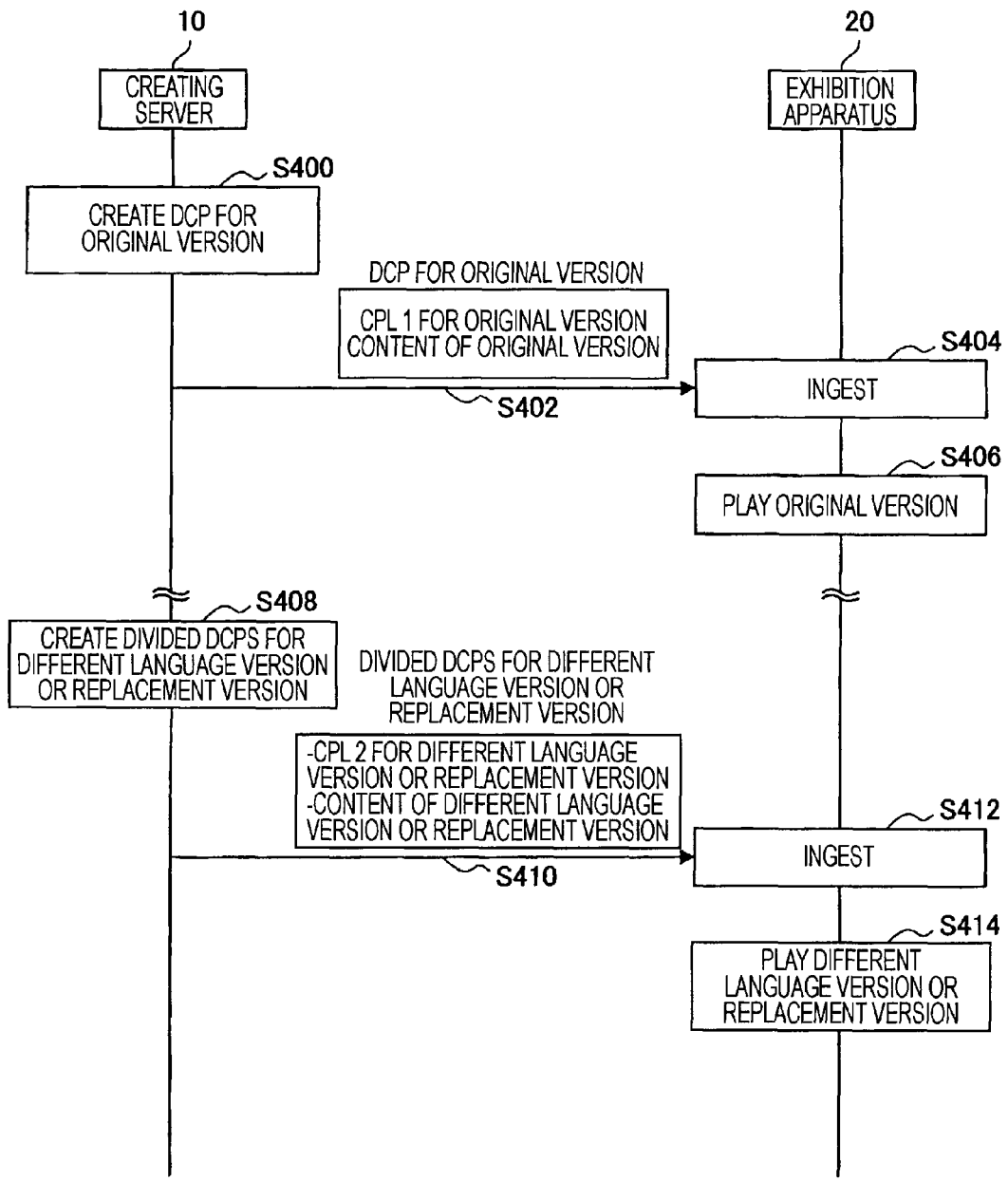

DIGITAL-CINEMA PROCESSING APPARATUS, INGESTING METHOD, AND PROGRAM

CROSS REFERENCES TO RELATED APPLICATIONS

The present invention contains subject matter related to Japanese Patent Application JP 2007-126011 filed in the Japanese Patent Office on May 10, 2007, the entire contents of which are incorporated herein by reference.

BACKGROUND OF THE INVENTION

1. Field of the Invention

The present invention relates to digital-cinema processing apparatuses, ingesting methods, and programs.

2. Description of the Related Art

With the progress of digital technology, the environment of cinemas is changing from film to digital. Furthermore, recently, exhibition apparatuses that are capable of digital exhibition, such as digital projectors, are being introduced in many exhibition theaters. That is, the era of digital cinema in a real sense is coming. A digital cinema refers to a cinema that is produced using video equipment instead of a film camera for shooting, or a cinema that is distributed and played without using a film.

In order to produce a digital cinema, in addition to using picture and sound techniques for precisely reproducing image and sound intended by the producer, data is to be produced in a format called a digital cinema package (DCP), conforming to specifications proposed by the Digital Cinema Initiatives (DCI), established by the seven major US studios. The specifications involve, for example, color space conversion, compression, and encryption for copyright protection. As screen sizes for DCPs, currently, for example, 4 k (4096×2160 pixels) and 2 k (2048×1080 pixels) are defined.

When a digital cinema system that uses such a DCP is formed, a DCP created at a server provided at a cinema distribution company is provided to each theater, and the DCP is played at an exhibition apparatus provided at the theater, whereby the digital cinema is exhibited. At this time, the DCP distributed from the distribution company is ingested in a storage device (e.g., a hard disk drive) of the exhibition apparatus. The term "ingest" herein refers to converting data of a digital cinema created at another apparatus into a data format supported by a recipient apparatus and capturing the data. The "ingest" is similar to "import", which means capturing of data by an ordinary information processing apparatus.

For example, Japanese Unexamined Patent Application Publication No. 2004-355342 and Japanese Unexamined Patent Application Publication No. 2003-308252 disclose methods for importing music content recorded on a medium such as an audio compact disk (CD) to a client terminal (PC). However, these documents does not disclose methods for ingesting a DCP of a digital cinema in an exhibition apparatus.

SUMMARY OF THE INVENTION

Since a digital cinema with a high picture quality and sound quality has a large volume of data, in order to readily distribute a DCP from the creating server to the exhibition apparatus, it is possible to divided the single DCP into a plurality of divided units (volumes). In order to allow a DCP to be divided, the DCI standard mentioned above dictates that a volume index, which serves as index information of a divided unit, be included in a DCP.

Actually, however, a suitable format for dividing a DCP has not been defined. Furthermore, existing exhibition apparatuses do not support ingestion of divided DCPS. Thus, even if a DCP of a digital cinema is divided into a plurality of divided DCPs and the divided DCPs are distributed to an exhibition apparatus, a person who operates the exhibition apparatus checks the content of each of the divided DCPs and manually integrate a plurality of divided DCPs for the same digital cinema before ingesting the divided DCPs in the exhibition apparatus. Therefore, according to the existing ingestion method, the storage device has to have a large storage capacity. Furthermore, the method is inconvenient in that the person who operates the exhibition apparatus takes time and labor for laborious tasks. Accordingly, there has been a demand for a suitable format for division of a DCP and a method with which divided DCPs can be readily ingested in an exhibition apparatus separately on a per-digital-cinema basis.

It is desired to provide a digital cinema processing apparatus, an ingesting method, and a program with which divided DCPs divided according to a suitable format can be readily ingested separately on a per-digital-cinema basis.

According to an embodiment of the present invention, there is provided a digital-cinema processing apparatus for ingesting a digital cinema package (DCP) in a storage device. The digital-cinema processing apparatus includes a DCP obtaining unit configured obtain at least one divided DCP as a divided DCP to be ingested among a plurality of divided DCPs including a common asset map corresponding to a digital cinema, the plurality of divided DCPs having allocated thereto one or more picture track files, sound track files, and/or subtitle track files for the digital cinema; an asset-map-information extracting unit configured to extract asset map information from the asset map included in the divided DCP to be ingested, the asset map information being information unique to the asset map; a directory determining unit configured to determine an ingestion destination directory for the divided DCP to be ingested in the storage device on the basis of the asset map information; and an ingesting unit configured to ingest the divided DCP to be ingested in the ingestion destination directory of the storage device.

In the digital-cinema processing apparatus described above, the DCP obtaining unit obtains at least one divided DCP among a plurality of divided DCPs having allocated thereto one or more picture track files, sound track files, and/or subtitle track files (hereinafter collectively referred to as "content files") constituting the digital cinema. The asset-map-information extracting unit extracts asset map information from the asset map included in the divided DCP. Since the asset map is common among a plurality of divided DCPs created for one digital cinema, the asset map corresponds to the digital cinema on a one-to-one basis. Thus, the asset map information extracted from the asset map is unique to the asset map, so that the asset map information can serve as identification information of the source digital cinema of the divided DCP. The directory determining unit determines a directory corresponding to the asset map information as an ingestion destination directory for the divided DCP, and the ingesting unit ingests the divided DCP in the ingestion destination directory. Accordingly, divided DCPs can be ingested separately on a per-digital-cinema basis.

The directory determining unit may be configured to check whether a directory corresponding to the asset map information already exists in the storage device, to determine the existing directory as the ingestion destination directory if the directory exists, and to newly create a directory corresponding to the asset map information as the ingestion destination directory if the directory does not exist. In this case, it is possible to create corresponding to different pieces of asst map information without duplicates, and to ingest divided DCPs in the separate directories for individual digital cinemas.

The asset map information may be identification information of the asset map or a hash value of the asset map. In this case, identification information included in advance in the asset map or a hash value that can be calculated from the asset map can be used as asset map information unique to the asset map.

The digital-cinema processing apparatus may further include a playing unit configured to play one or more picture track files, sound track files, and/or subtitle track files in the directory in which the divided DCP has been ingested. In this case, the divided DCP further includes a composition playlist (CPL) corresponding to an exhibition version of the digital cinema and associating one or more picture track files, sound track files, and/or subtitle files allocated to the divided DCP, and the playing unit is configured to play the picture track files, sound track files, and/or subtitle track files according to the CPL in the directory in which the divided DCP has been ingested. Thus, a digital cinema can be divided into a plurality of divided DCPs corresponding to individual exhibition versions of the digital cinema. Accordingly, by ingesting a divided DCP including a CPL and content files corresponding to an exhibition version, it is possible to play the exhibition version of the digital cinema corresponding to the divided DCP without ingesting other divided DCPs.

The digital-cinema processing apparatus may further include a file verifying unit configured to verify integrity of each file in the divided DCP. In this case, each of the divided DCPs further includes a common packing list (PL) corresponding to the digital cinema, and the file verifying unit is configured to verify the integrity of each file on the basis of a hash value described in the PL. Thus, by including the PL in all divided DCPS, upon ingestion of each divided DCP, it is possible to verify the integrity of files in the divided DCP.

The digital-cinema processing apparatus may further include an ingestion-status checking unit configured to check ingestion status of the plurality of divided DCPS. In this case, the asset map includes division number information representing the total number of the plurality of divided DCPs created for the digital cinema, and the ingestion-status checking unit is configured to check the ingestion status on the basis of the division number information included in the asset map. Accordingly, it is possible to check the ingestion status on the basis of the division number information, such as whether each divided DCP for a digital cinema has been ingested, or the number of divided DCPs that have been ingested.

According to another embodiment of the present invention, there is provided a method of ingesting a digital cinema package (DCP) in a storage device. The method includes the steps of obtaining at least one divided DCP as a divided DCP to be ingested among a plurality of divided DCPs including a common asset map corresponding to a digital cinema, the plurality of divided DCPs having allocated thereto one or more picture track files, sound track files, and/or subtitle track files for the digital cinema; extracting asset map information from the asset map included in the divided DCP to be ingested, the asset map information being information unique to the asset map; determining an ingestion destination directory for the divided DCP to be ingested in the storage device on the basis of the asset map information; and ingesting the divided DCP to be ingested in the ingestion destination directory of the storage device.

According to yet another embodiment of the present invention, there is provided a program for causing a computer to function as a digital-cinema processing apparatus for ingesting a digital cinema package (DCP) in a storage device including a DCP obtaining unit configured obtain at least one divided DCP as a divided DCP to be ingested among a plurality of divided DCPs including a common asset map corresponding to a digital cinema, the plurality of divided DCPs having allocated thereto one or more picture track files, sound track files, and/or subtitle track files for the digital cinema; an asset-map-information extracting unit configured to extract asset map information from the asset map included in the divided DCP to be ingested, the asset map information being information unique to the asset map; a directory determining unit configured to determine an ingestion destination directory for the divided DCP to be ingested in the storage device on the basis of the asset map information; and an ingesting unit configured to ingest the divided DCP to be ingested in the ingestion destination directory of the storage device.

According to these embodiments of the present invention, it is readily possible to ingest divided DCPs divided according to a suitable format into a digital cinema processing apparatus such as an exhibition apparatus, separately on a per-digital-cinema basis.

BRIEF DESCRIPTION OF THE DRAWINGS

FIG. 20 is a diagram showing an example of a procedure for distributing and playing a plurality of exhibition versions according to the embodiment.

DESCRIPTION OF THE PREFERRED EMBODIMENTS

Now, a preferred embodiment of the present invention will be described in detail with reference to the accompanying drawings. In this specification and drawings, components having substantially the same functions and configurations are designated by the same numerals, and repeated description thereof will be refrained.

1. System Configuration

Figure 1:
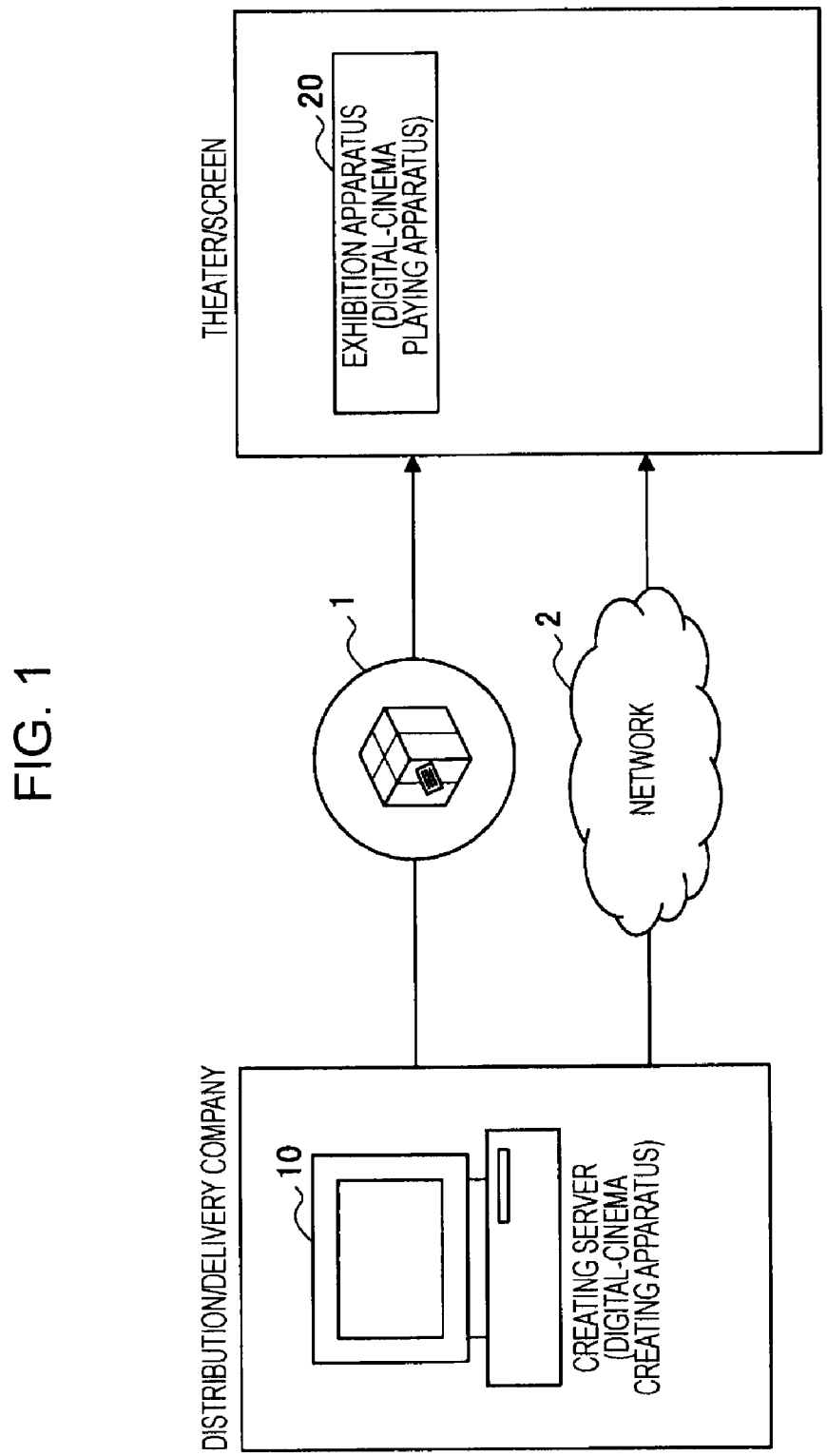
FIG. 1 is a schematic diagram showing the configuration of a digital cinema system according to an embodiment of the present invention.

First, a digital cinema system according to an embodiment of the present invention will be described with reference to FIG. 1. FIG. 1 is a diagram schematically showing the configuration of the digital cinema system according to this embodiment.

As shown in FIG. 1, the digital cinema system according to this embodiment includes a creating server 10 provided at a production company, a distribution company, or a delivery company of digital cinema, and an exhibition apparatus 20 provided at a theater (movie theater, a drive theater, or the like) where digital cinemas are played on screens.

The creating server 10 in this embodiment is an example of a digital-cinema creating apparatus. The creating server 10 creates a digital cinema package (DCP) conforming to specifications defined by the Digital Cinema Initiatives (DCI), described earlier. More specifically, the creating server 10 obtains various types of content data that serve as raw materials of a digital cinema, for example, from a cinema production company. The content data includes, for example, picture data, sound data, subtitle data, and so forth. The creating server 10 processes these pieces of content data (e.g., picture processing, compression, encryption, etc.) to create an encrypted DCP and key information used to play the encrypted DCP for the digital cinema. The DCP and key information created by the creating server 10 is provided to theaters from a distribution company or a delivery company.

The exhibition apparatus 20 is an example of a digital-cinema processing apparatus and a digital-cinema playing apparatus. The exhibition apparatus 20 obtains the DCP and key information provided from the creating server 10, and ingests and stores the DCP and key information in a storage device provided in association with the exhibition apparatus 20. The storage device is a storage device having such a large storage capacity that a digital cinema for exhibition can be stored therein, such as a hard disk drive (HDD). Furthermore, the exhibition apparatus 20 decrypts and expands content data included in the DCP stored in the storage device, such as picture, sound, and/or subtitle data, and plays the resulting content on a screen in a theater.

In the digital cinema system described above, an encrypted DCP and key information used to play the encrypted DCP are distributed from the creating server 10 of a production company, a distribution company, or the like to the exhibition apparatus 20 of a theater. That is, the DCP and key information are provided from the creating server 10 to the exhibition apparatus 20, whereby the exhibition apparatus 20 obtains the DCP and key information. For example, the DCP and key information can be transferred from the creating server 10 to the exhibition apparatus 20 using a removable recording medium 1 or via a network 2.

First, a case where a DCP is distributed using the removable recording medium 1 will be described. The removable recording medium can be attached to and detached from the creating server 10 and the exhibition apparatus 20, and has such a storage capacity that a DCP of a digital cinema and key information for the DCP can be stored thereon. The removable recording medium 1 may be any type of removable recording medium, for example, a magnetic disk such as a hard disk, an optical disk such as a next-generation DVD, a DVD-R, a DVD-RW, a DVD-RAM, or a magneto-optical disk, or various types of semiconductor memory. First, the creating server 10 stores a DCP and key information that have been created on the removable recording medium 1. Then, the recording medium 1 is detached from the creating server 10 is then transported to a theater in any suitable manner, and is then loaded on the exhibition apparatus 20. Then, the exhibition apparatus 20 reads the DCP and key information from the removable recording medium, and ingests the DCP and recording medium to a storage device (e.g., an HDD) of the exhibition apparatus 20.

Next, a case where a DCP is distributed using the network 2 will be described. The network 2 is a communication medium that connects the creating server 10 and the exhibition apparatus 20 with each other so that communication can be performed. The network 2 may be wired or wireless. For example, as the network 2, a public circuit network such as the Internet, a telephone circuit network, or a satellite communication network, or a private circuit network such as various types of local area networks (LANs) including Ethernet networks, wide area networks (WANs), and Internet Protocol Virtual Private Networks (IP-VPNs) may be used. By transferring a DCP and key information created by the creating server 10 through the network 2 to the exhibition apparatus 20, the DCP and key information can be provided quickly from the creating server 10 to the exhibition apparatus 20. Then, the exhibition apparatus 20 ingests and stores the DCP and key information received from the creating server 10, in a storage device (e.g., an HDD) of the exhibition apparatus 20.

When DCPs are distributed from the creating server 10 to the exhibition apparatus 20, a DCP for only one digital cinema may be distributed, or DCPs for a plurality of digital cinemas may be distributed together. Furthermore, instead of distributing a complete DCP (undivided DCP) for a digital cinema, it is possible to distribute a plurality of divided DCPs created by dividing the DCP for the digital cinema. In this case, it is possible to distribute all the divided DCPs for the digital cinema simultaneously, or to distribute only some of the divided DCPs.

In this embodiment, at the creating server 10, a DCP for a digital cinema is divided into a plurality of divided DCPs (also referred to as volumes) having a suitable data format, and the divided DCPs are provided from the creating server 10 to the exhibition apparatus 20. The division of a DCP is advantageous as described below.

Digital cinema content generally has a large data volume. Thus, considering the storage capacity of the removable recording medium 1 or the communication bandwidth of the network 2, it is preferable to divide the digital cinema content into a plurality of divided units, i.e., divided DCPs (volumes), and to distribute the divided DCPs. This is advantageous in that it becomes easier to handle the DCP when the DCP is distributed, so that the DCP can be distributed readily and quickly.

In some cases, a plurality of exhibition versions are created for a digital cinema according to intensions of the cinema producer or regions of exhibition. For example, when a digital cinema is released in a plurality of countries, a plurality of language versions (e.g., English version, Japanese version, French version, and so forth) are created. Also, in accordance with regulations or religions in the countries where the digital cinema is exhibited, contracts among companies (advertisement, copyright, etc.), and market needs, in some cases, some parts of the original version of a digital cinema are changed, modified, or remade to create a replacement version. When a plurality of exhibition versions have been created, in some cases, a certain exhibition version is (e.g., an English version or an original version) is first distributed and then another exhibition version (e.g., a Japanese version or a replacement version). In such cases, it is possible to distribute only content data of portions corresponding to differences between these two versions without distributing content data of portions that are common between the two versions. This serves to reduce the amount of data of the DCP that is distributed, so that it becomes easier to handle the DCP.

As described above, the division of a DCP is performed by a digital cinema production company or distribution company that distributes the DCP. Without limitation to the case where a DCP is stored and transferred on the physical recording medium 1, also in the case where a DCP is transferred via the network 2, it is beneficial to divided the DCP in a suitable manner. Considering what has been described above, in the digital cinema system according to this embodiment, a plurality of divided DCPs created by dividing a DCP for a digital cinema are distributed from the creating server 10 to the exhibition apparatus 20, and the exhibition apparatus 20 integrates and ingests the divided DCPs for each digital cinema. Furthermore, in this embodiment, a DCP for a digital cinema is divided on a per-exhibition-version basis, so that a plurality of divided DCPs for the individual exhibition versions are created. Thus, at the exhibition apparatus 20, it is possible to play an exhibition version corresponding to a divided DCP that has already been obtained without obtaining all the divided DCPs for the digital cinema. Now, the configuration of a digital system for achieving the feature described above will be described in detail.

2. Structure of DCP

Figure 2:
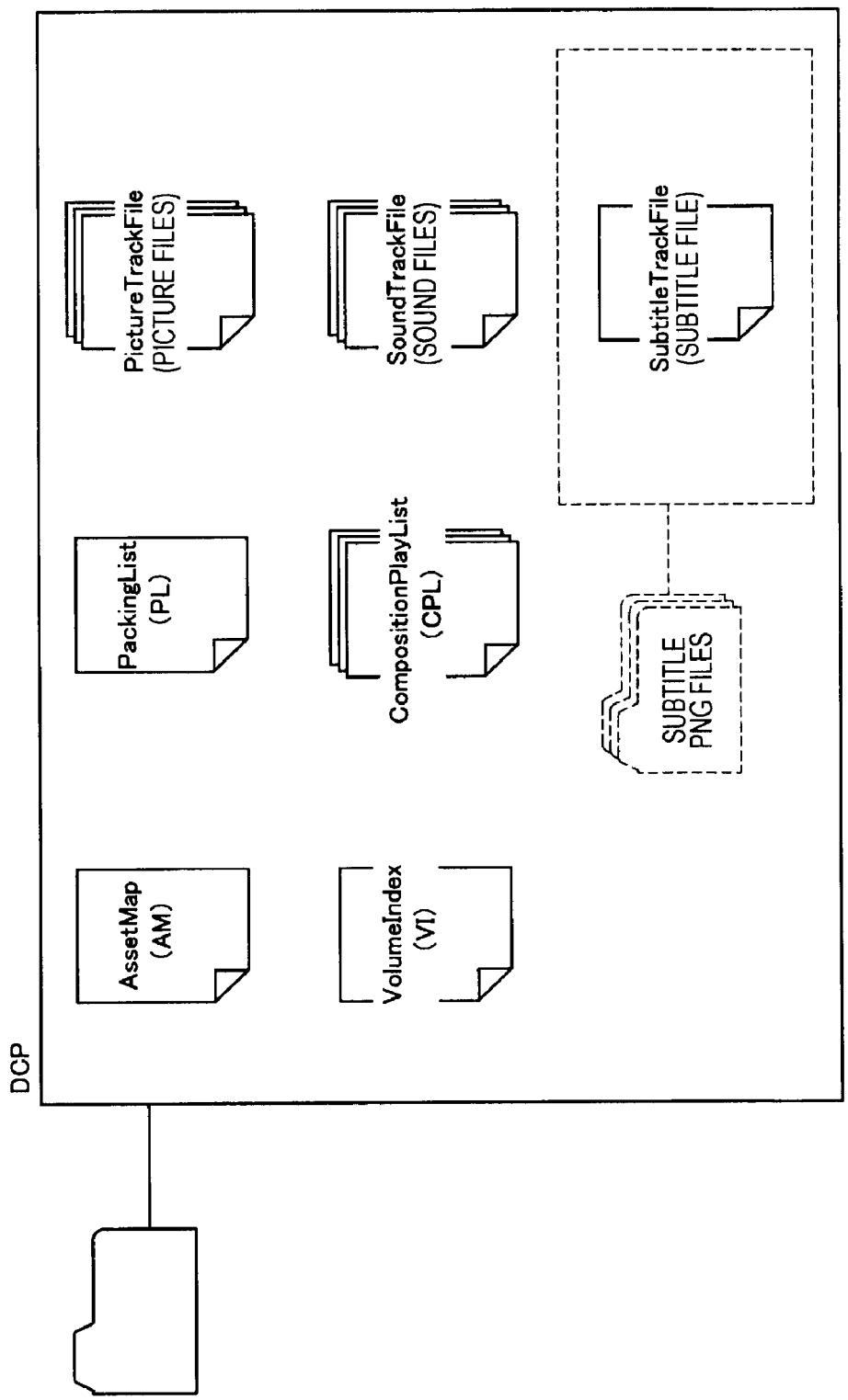
FIG. 2 is a diagram for explaining a file structure of an ordinary DCP according to the embodiment.

First, a file structure of an ordinary DCP will be described with reference to FIG. 2. FIG. 2 is diagram showing a file structure of an ordinary DCP.

Digital cinema content is distributed in a data format called a DCP, conforming to the specifications proposed by DCI. The DCP is a set of various types of data files used for playing a digital cinema. As shown in FIG. 2, for example, a DCP includes an asset map (hereinafter also referred to as "AM"), a volume index (hereinafter also referred to as "VI"), a packing list (hereinafter also referred to as "PL"), a composition playlist (hereinafter also referred to as "CPL"), a picture track file (hereinafter also referred to as a "picture file"), a sound track file (hereinafter also referred to as an "sound file"), a subtitle track file (hereinafter also referred to as a "subtitle file"), a subtitle PNG file (hereinafter also referred to as a "PNG file"), and so forth. Each of these files has assigned thereto globally unique identification information, such as a universally unique identifier (UUID), and the UUID of each file is described in the file. Now, the files constituting a DCP will be individually described below.

Asset Map (AM)

An asset map describes a list regarding all the files (except the asset map itself) included in a DCP. More specifically, the asset map describes a list in which the UUIDs described in the individual files in the DCP are associated with the file names (paths) of the files. The asset map can be used, for example, when the user wishes to find what kinds of files are included in the DCP. Furthermore, the asset map describes a UUID assigned to the asset map itself. The asset map is created on a per-digital-cinema basis, and even when the DCP is divided as will be described later, only one asset map is created for one digital cinema commonly for a plurality of divided DCPs. Thus, by checking identification information, e.g., a UUID, of an asset map in a divided DCP, which is unique to the asset map, the exhibition apparatus 20 can determine a digital cinema to which the divided DCP including the asset map belongs. Since the subtitle PNG file has such a format that it is not allowed to describe a UUID therein, individual PNG files are associated with UUIDs by describing association between the file names of the individual PNG files and their UUIDs.

Volume Index (VI)

VI describes index information for identifying individual divided units (hereinafter referred to as division index information) in a case where a DCP is divided into a plurality of divided units (divided DCPs). As the division index information, for example, serial numbers (e.g., 1, 2, 3, ...) described in a markup language, such as the Extensible Markup Language (XML), may be used. For example, in a case where a DCP of a digital cinema is divided into two, "1" is described as division index information in the VI of the first divided DCP, and "2" is described as division index information in the VI of the second divided DCP. In a case where a DCP is not divided, "1" is described as division index information in the VI.

Packing List

PL describes a list in which the UUIDs of all the files (except the PL itself) included in the DCP are associated with their hash values. The hash values (e.g., 160-bit data sequences) are values obtained by hashing data of the individual files in the DCP. It is possible to verify the integrity (i.e., whether the data has been kept uncorrupted) of the individual files by checking matching between the files of the individual files described in PL and hash values actually calculated from the individual files.

Composition Play List (CPL)

CPL is a playlist used to play content (picture, sound, and subtitle content) included in the DCP. CPL describes link information that interrelates picture track files and sound track files (and/or subtitle track files) corresponding to each exhibition version of the digital cinema. The CPL is created for each exhibition version of a digital cinema.

More specifically, CPL includes UUIDs of individual files and data entry points and durations of the individual files for all the reels, the files including picture track files (MXF files), which are picture files, sound track files (MXF files), which are sound files, and/or subtitle track files (either in MXF format or XML format), which are subtitle files. The reels herein refer to units that are formed by temporally dividing a unit of playing including picture and sound content (and subtitles as needed). For example, in a case where a digital cinema (120 minutes) is temporally divided equally into 10 units, 10 reels (12 minutes each) are created. The entry points are offsets represents points for starting playing of data of picture or sound files of the individual reels. The durations are size information representing the effective ranges of data from the entry points.

In a case where one digital cinema is composed of a plurality of reels, CPL describes information regarding all the reels (UUIDs of picture, sound, and subtitle files constituting the individual reels, and entry points and durations thereof), and all the reels constitutes one unit of playing. Usually, a digital cinema is composed of a plurality of reels, so that reel information regarding all the reels is described together in one CPL.

An exhibition version refers to a unit of screen playing of a digital cinema, such as a language version (e.g., an English-sound version, a Japanese-sound version, or a Japanese-subtitle version). In this embodiment, a CPL is created for each exhibition version of a digital cinema. For example, in a case where there exist an English version and a Japanese version of a digital cinema, for example, the following three CPLs are created:
(1) CPL for the English-sound version (CPL in which English picture file is associated with English sound file)
(2) CPL for the Japanese-sound version (CPL in which English picture file is associated with Japanese sound file)
(3) CPL for the Japanese-subtitle version (CPL in which English picture file is associated with English sound file and Japanese subtitle file)

By changing association of picture, sound, and subtitle files as desired, it is possible to play various versions of a cinema.

Picture Track File (Picture File)

A picture track file is a file of picture data compressed according to a predetermined format, for example, an MXF file. A number of picture track files corresponding to the number of reels that are needed exists. Furthermore, it is possible to create a plurality of types of picture files for the same scene (e.g., a picture file for an original version and a picture file for a replacement version).

Sound Track File (Sound File)

A sound track file is a file of sound data compressed according to a predetermined format, for example, an MXF file. A number of sound track files corresponding to the number of reels that are needed exists. Furthermore, it is possible to create a plurality of types of sound files for the same scene (e.g., a sound file for an original version and a sound file for a replacement version).

Subtitle Track File (Subtitle File)

A subtitle track file is a file describing timing of displaying subtitles, for example, an XML file or an MXF file. A number of subtitle files corresponding to the number of reels that are needed exists. Furthermore, it is possible to create a plurality of types of subtitle files for the same scene (e.g., a subtitle file for an original version and a subtitle file for a replacement version). data representing the content of subtitles per se and font data for the subtitles may be described as text data in XML or the like in the subtitle track file. Alternatively, subtitle data may be described in a separate file. In a case where PNG (Portable Network Graphics) data is used as subtitle data in a separate file, information representing links (e.g., file names of PNG files) to the individual PNG files (subtitle PNG files) is described in XML or the like.

Subtitle PNG File (PNG File)

A subtitle PNG file is a file of PNG data representing content of subtitles. In a case where the subtitle track file is described in XML and PNG subtitle data is used, a number of PNG files corresponding to the number of subtitle files is needed.

When picture content or sound content is absent in a digital cinema, no picture track file or subtitle track file exists in the DCP, and when subtitles are absent in a digital cinema, no subtitle track file and subtitle PNG file exist in the DCP. Even when subtitles exist, if subtitle PNG data is not needed, although a subtitle track file describing subtitle text data and timing of displaying subtitles is needed, no subtitle PNG file is needed. Furthermore, as well as the files described above, a DCP may include any types of files as needed.

The picture track file, sound track file, and subtitle track file (and subtitle PNG file) described above include content data representing the content of the digital cinema. Hereinafter, the picture track file, sound track file, and/or subtitle track file (and subtitle PNG file) will be collectively referred to as "content files". Furthermore, in the following description, unless otherwise explicitly stated, it is assumed that a subtitle track file (subtitle file) includes a subtitle PNG file belonging thereto.

Figure 3:
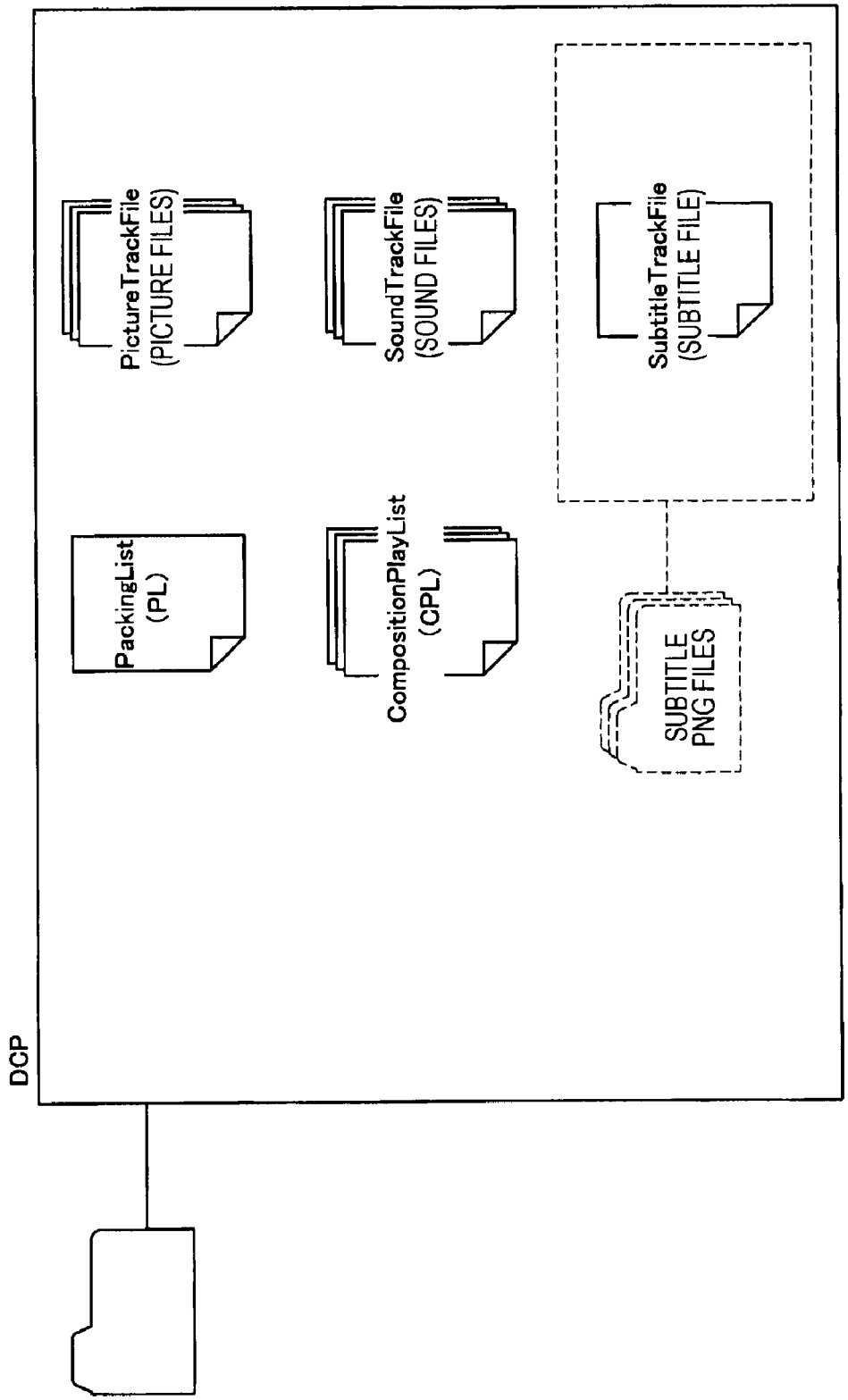
FIG. 3 is a diagram for explaining a file structure of an ordinary DCP according to the embodiment.

Next, an example of modification of an ordinary DCP will be described with reference to FIG. 3. Even if no asset map (AM) or volume index (VI) is included in a DCP, as shown in FIG. 3, it is possible to ingest the DCP and to play the digital cinema. In this case, however, since VI is absent, it is not possible to divide the DCP into a plurality of divided DCPS. Instead, in this modification, each divided DCP (volume) includes an asset map (AM) and a volume index (VI).

3. Structure of Divided DCP

Figure 4:
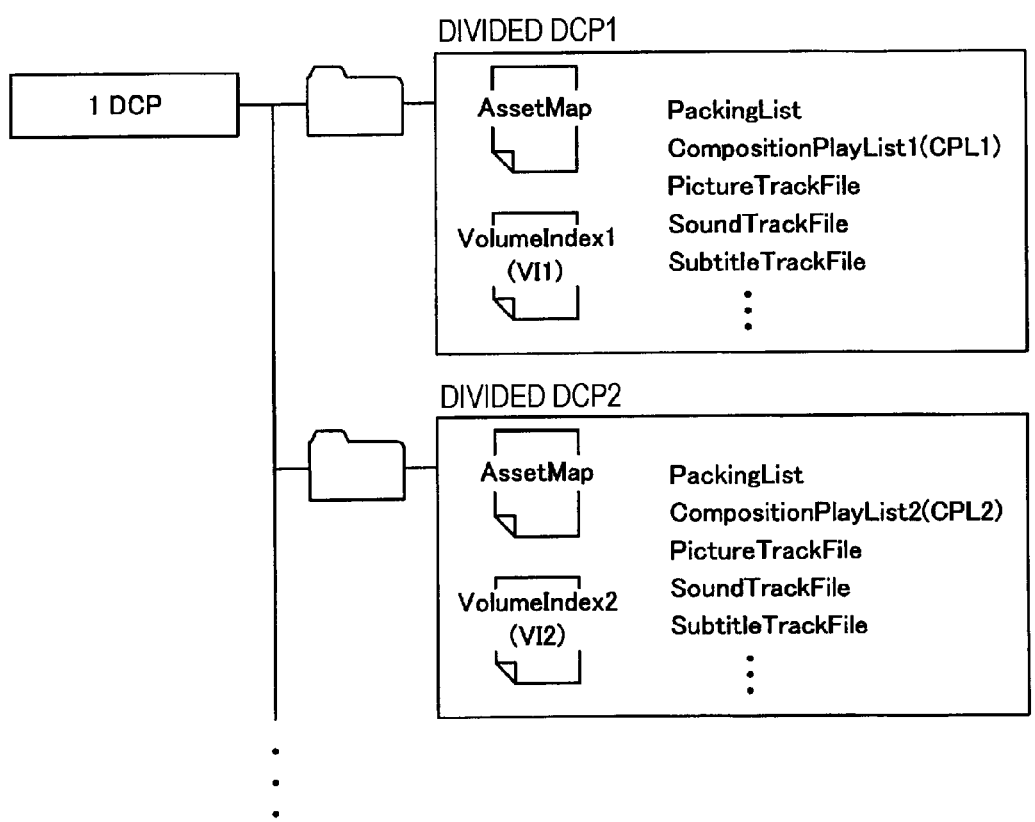
FIG. 4 is a diagram for explaining a file structure of divided DCPs according to the embodiment.

Now, the structure of a divided DCP will be described with reference to FIG. 4. FIG. 4 is a diagram showing the file structure of a divided DCP in this embodiment.

As shown in FIG. 4, a DCP (parent DCP) for a digital cinema is divided into a plurality of divided DCPs (divided DCP 1, divided DCP 2, . . . ), and a plurality of picture track files (picture files), a plurality of sound track files (sound files), and a plurality of subtitle track files (subtitle files) are allocated to the individual divided DCPs 1, 2, . . . without duplicates. In the example shown in FIG. 4, similarly to the ordinary DCP described with reference to FIG. 2, each of the divided DCPs 1, 2, includes an asset map, a VI, a PL, a CPL, a picture file, a sound file, and a subtitle file. However, without limitation to the example shown in FIG. 4, of these files, as long as the asset map, VI, and CPL are included in each divided DCP, the PL and content files may be allocated arbitrarily to other divided DCPs. That is, a divided DCP need not necessarily include content files such as picture files. Hereinafter, the structures and roles of the asset map, VI, and CPL included in a divided DCP will be described individually.

First, the asset map in the divided DCP will be explained. For a plurality of divided DCPs for one digital cinema, only one asset map is created commonly for the plurality of divided DCPS, and the common asset map is included in each of the divided DCPs. That is, the asset map does to vary among divided DCPs for the same digital cinema. Thus, the common asset map serves as identification information representing the digital cinema corresponding to the divided DCPs including the asset map (the digital cinema divided into the divided DCPs).

More specifically, each of a plurality of divided DCPs for the same digital cinema includes the common asset map. In the common asset map, the same UUID is described, and information regarding all the files included in all the divided DCPs for the digital cinema is described. That is, when a DCP is divided into n units, in the asset map in each of the divided DCPs 1 to n, information (file names and UUIDS) regarding all the files in all the divided DCPs 1 to n is described, and the same UUID assigned to the asset map is described. The plurality of divided DCPs created by dividing the same DCP include the same asset map. Thus, by extracting asset map information (e.g., UUID or hash value) from the asset map in a divided DCP, which is unique to the asset map, and checking the asset map information, it is possible to determine the digital cinema to which the divided DCP belongs (i.e., the parent DCP before division). Thus, the exhibition apparatus 20 can classify divided DCPs obtained from the creating server 10 on a per-digital-cinema basis (i.e., on a per-asset-map-information basis), and inject the divided DCPs into directories corresponding to individual digital cinemas.

Furthermore, in the asset map, information representing the number of divided units, representing the total number of DCPs created for one digital cinema, is described. For example, in a case where a digital cinema has been divided into 10 units, "10" is described as division number information in the asset map. Thus, the creating server 10 having obtained a divided DCP can determine the number of divided units created by dividing the digital cinema corresponding to the divided DCP.

Furthermore, the asset map can describe to which divided DCP each file regarding a source digital cinema is included. More specifically, in the asset map, in which file names and UUIDs of individual files regarding the same digital cinema are described, division index information of divided DCPs (e.g., serial numbers) including the individual files may be described together with the file names and UUIDs. For example, in a case where a certain picture file 1 is allocated to the second divided DCP 2, in the asset map, the file name and UUID of the picture file 1 are described in association with the serial number "2" serving as division index information of the divided DCP 2. Thus, the exhibition apparatus 20 having obtained divided DCPs can determine which divided DCP includes each file with reference to the asset map in the divided DCPs. However, division index information for each of the files need not be described in the asset map.

Next, the volume index (VI) in the divided DCP will be described. As described earlier, VI describes division index information (e.g., a serial number) of the divided DCP including the VI. The VI can be used for mutual distinction among a plurality of divided DCPs corresponding to the same digital cinema. In a case where a DCP has been divided into a plurality of divided DCPs, in the VI in each of the divided DCPs, division index information representing the divided DCP is described. For example, referring to FIG. 3, in VI 1 of the first divided DCP 1, a serial number "1" is described as division index information, and in VI 2 of the second divided DCP 2, a serial number "2" is described as division index information. In contrast to the asset map described earlier, which is common among the plurality of divided DCPS, VI describes division index information that varies among the individual DCPS. With such VI included in the divided DCPs, the exhibition apparatus 20 having obtained a divided DCP can determine the index of the divided DCP and to determine whether the divided DCP has already been ingested. In a case where a DCP is not divided, VI is not needed.

Next, a composition playlist (CPL) in the divided DCP will be described. As described earlier, in this embodiment, a DCP is divided on a per-exhibition-version basis, and CPLs are created individually on a per-exhibition-version basis. That is, a CPL corresponds to an exhibition version of a digital cinema on a one-to-one basis, and associates content files (picture, sound, and subtitle files) of the exhibition version with each other. For example, referring to FIG. 4, the first divided DCP 1 includes CPL 1 corresponding to a first exhibition version, and the CPL 1 associates a picture file, a sound file, and a subtitle file of the first exhibition version with each other. As described above, in this embodiment, a digital cinema is divided on a per-exhibition-version basis, i.e., into units each including a CPL corresponding to an exhibition version and content files associated with each other by the CPL.

Thus, the exhibition apparatus 20 having obtained divided DCPs can play content files in the divided DCPs on the basis of CPLs in the divided DCPs. Thus, simply by ingesting divided DCPs as needed, the exhibition apparatus 20 can play the divided DCPS. Thus, without obtaining all the divided DCPs for a digital cinema, upon obtaining at least one DCP, it becomes possible to play the exhibition version corresponding to the divided DCP. This is advantageous since the exhibition apparatus 20 can play a digital cinema on a per-divided-unit basis. Although the divided DCPs 1 and 2 include content files associated by CPLs 1 and 2, respectively, in the example shown in FIG. 4, without limitation to this example, as long as each DCP includes at least one CPL, content files need not necessarily be included.

Furthermore, by including a packing list (PL) in all the divided DCPs as shown in FIG. 4, at the exhibition apparatus 20, advantageously, it is possible to verify the integrity of each file in a divided DCP using a hash value described in PL in the divided DCP. For example, the exhibition apparatus 20 calculates a hash value of a picture file actually included in a divided DCP, and compares the calculated hash value with a hash value of the picture track file described in PL included in the divided DCP, thereby checking whether data of the picture file has not been corrupted. Since PL is text data and has a very small size, it does not cause any harm to add PL in the divided DCP.

Hereinabove, the file structure of a divided DCP in this embodiment has been described. Although a data format that allows division of a DCP has been defined by DCI, a suitable format has not been proposed as to how a plurality of files included in a DCP for a digital cinema (parent DCP) are to be allocated to individual divided DCPs, i.e., a criteria and unit of division of a DCP. In contrast, according to this embodiment, instead of allocated files included in a DCP for a digital cinema substantially equally to the individual divided DCPs, CPLs and divided DCPs are created on a per-exhibition-version basis as described above, and content files are allocated to the individual divided DCPs on a per-exhibition-version basis.

4. Specific Example of Divided DCP

Figure 5:
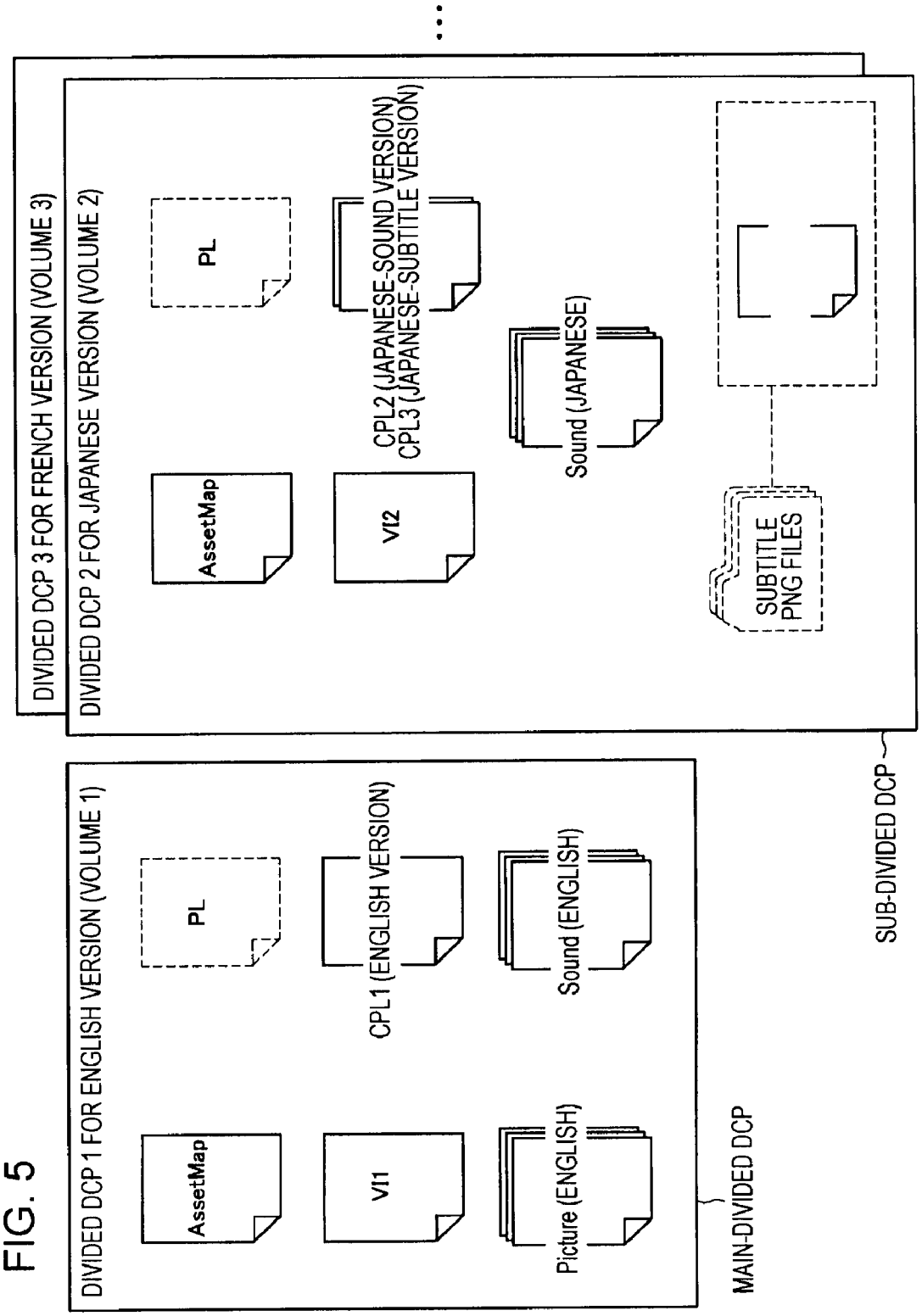
FIG. 5 is a diagram for explaining a file structure of divided DCPs created on a per-language-version basis according to the embodiment.
Figure 6:
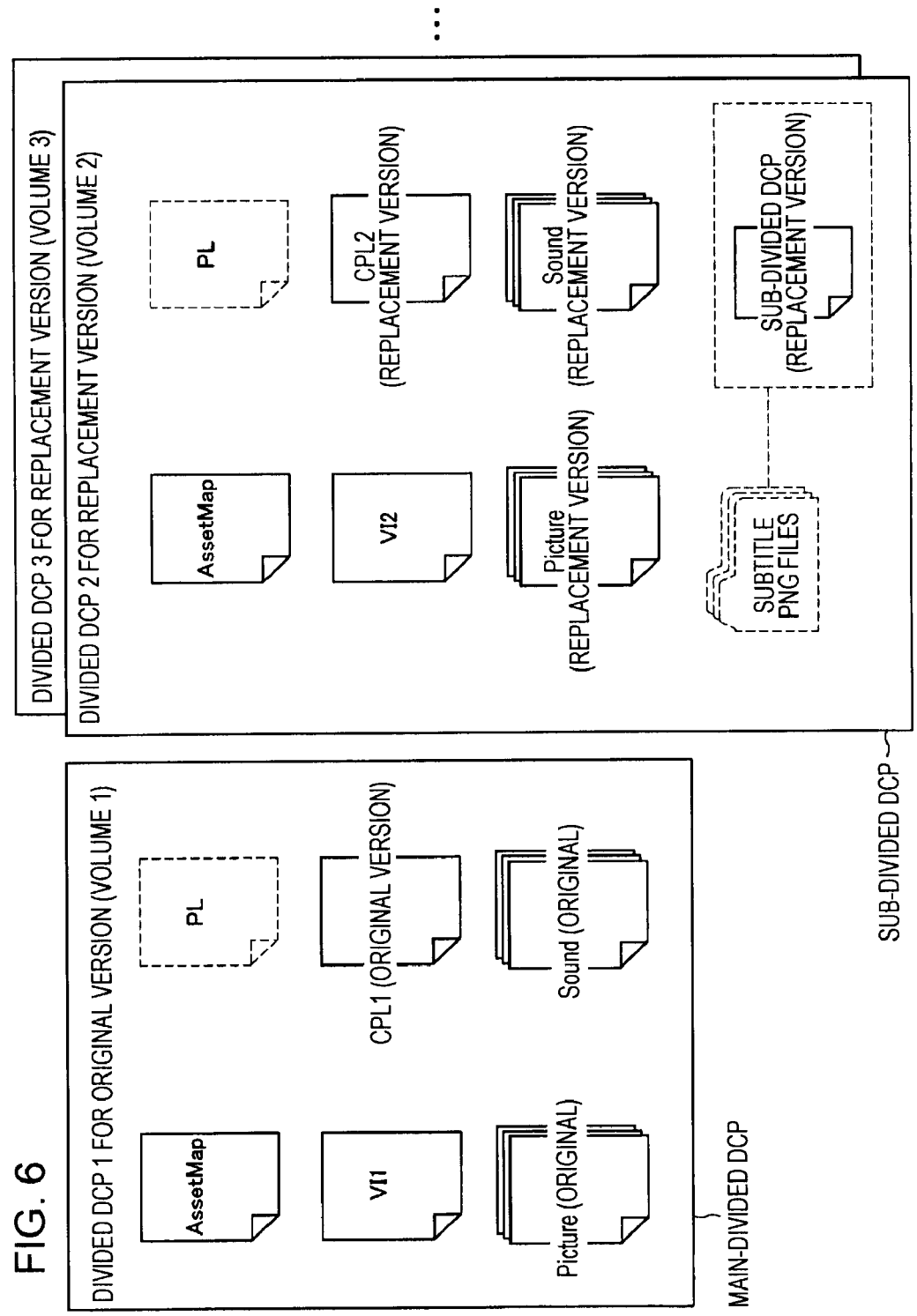
FIG. 6 is a diagram for explaining a file structure of divided DCPs corresponding to an original version and replacement versions according to the embodiment.

Now, a specific example of a divided DCP created on a per-exhibition-version basis in this embodiment will be described. FIG. 5 is a diagram showing a file structure of divided DCPs created on a per-language-version basis. FIG. 6 is a diagram showing a file structure of divided DCPs corresponding to an original version and a replacement version. In FIGS. 5 and 6, files indicated by dashed lines (PL and PNG) indicate files that need not necessarily be included in divided DCPs.

FIG. 5 shows an example of a division scheme in which versions in different languages are prepared as exhibition versions so that one digital cinema can be presented in various language versions. In the example shown in FIG. 5, a plurality of divided DCPs 1, 2, 3, . . . for individual languages versions are created for one digital cinema. That is, a DCP of a digital cinema is divided in to a divided DCP 1 (Volume 1) for an English version (a first language version), and divided DCPs 2, 3, . . . (Volumes 2, 3, . . . ) for language versions (second language versions) other than the English version. Generally, in a case where a digital cinema is created in an English speaking country, such as the United States, the sound of the digital cinema in the original version is in English. When the digital cinema is to be exhibited in other countries, the sound in English in the original version is replaced by sound in another language, subtitles in another language is added, or the like, whereby the digital cinema in another language version is created.

In the example shown in FIG. 5, as divided DCPs for language versions other than the English version, a divided DCP 2 for a Japanese version and a divided DCP 3 for a French version are shown. Obviously, divided DCPs for various other languages, such as German, Spanish, Chinese, and Korean, can be created. Although the following description mainly deals with the divided DCP 1 for the English version and the divided DCP 2 for the Japanese version, the description similarly applies to divided DCPs for other language versions.

The divided DCP 1 for the English version (divided DCP for the first language version) includes an English picture file (Picture) and sound file (Sound) of the original version of the digital cinema, a CPL 1 for the English version (CPL for the first language version), an asset map, a PL, and division version information (serial number "1") of the divided DCP 1. Of these, the CPL 1 for the English version associates with each other the English picture file and the English sound file included in the divided DCP 1 for the English version. By using the CPL 1 for the English version, it is possible to play the English version (English picture and sound) of the digital cinema.

The divided DCP for the English version corresponds to a divided DCP for the original version, including content files of the original version of the digital cinema (i.e., English picture and sound files), and also corresponds to a main-divided DCP including a content file that is associated commonly by a plurality of CPLs 1, 2, 3, . . . (i.e., English picture file).

The divided DCP 2 for the Japanese version (divided DCP for the second language version) includes a Japanese sound file (Sound) and subtitle file (Subtitle) constituting a replacement version of the digital cinema, a CPL 2 for the Japanese sound version (CPL for the second language sound version), a CPL 3 for the Japanese subtitle version (CPL for the second language subtitle version), an asset map, a PL, and division version information (serial number "2") of the divided DCP. Of these, the CPL 2 for the Japanese sound version associates with each other the English picture file included in the divided DCP 1 for the English version and the Japanese sound file included in the divided DCP 2 for the Japanese version. The CPL 3 for the Japanese subtitle version associates with each other the English picture file included in the divided DCP 1 for the English version and the Japanese subtitle file included in the divided DCP 2 for the Japanese version. By using the CPL 2 or 3 for the Japanese version, it is possible to play a Japanese version (English picture with Japanese sound or subtitles) of the digital cinema.

The divided DCP 2 for the Japanese version corresponds to a divided DCP for a replacement version, including content files (i.e., Japanese sound and subtitle files) of a replacement version of the digital cinema, and also corresponds to a sub-divided DCP including a content file (Japanese sound or subtitle file) associated independently by the CPL 2 or 3.

The asset map and PL included in the divided DCP 1 for the English version are the same as the asset map and PL included in the divided DCP 2 for the Japanese version. In the asset map and PL, information regarding all the files included in the divided DCPs 1, 2, 3, . . . for the same digital cinema is described. Furthermore, on the basis of VI 1 and VI 2 included in the divided DCPs 1 and 2, it is possible to identify the indices of the divided DCPS 1 and 2.

As described above, in the example shown in FIG. 5, a DCP is divided into a plurality of divided DCPs on a per-language-version basis. To each of the divided DCPs 1 and 2, the CPL 1 or CPLs 2 and 3 corresponding to each language version and content files for the language version are allocated. Since the English picture file is a content file that is used commonly among all language versions, the English picture file is included only in the divided DCP 1 (main-divided DCP) for the English version, which is the original version, and is not included in the divided DCP 2 (sub-divided DCP), which is another language version. That is, the divided DCP 2 for the Japanese version includes Japanese sound file and subtitle file as content files corresponding to the difference between the English and Japanese versions, and does not include the English picture file.

As described above, in this embodiment, only the divided DCP for the original version (divided DCP 1 for the English version) includes the content file commonly associated by the plurality of CPLs 1, 2, 3, . . . (English picture file), and the divided DCP for a replacement version (e.g., the divided DCP 2 for the Japanese version) includes only a content file (Japanese sound or subtitle file) corresponding to the difference between the replacement version and the original version. Thus, it is possible to minimize the amount of data of content file included in the divided DCP for the replacement version. This serves to reduce the total amount of data in a plurality of divided DCPs. Thus, in a case where all versions of a digital cinema are distributed from the creating server 10 to the exhibition apparatus 20, divided DCPs can be distributed efficiently, so that the needed capacity of the removable recording medium 1 or the load of the network 2 can be reduced. Furthermore, by distributing the divided DCP 2 for the Japanese version after distributing the divided DCP 1 for the English version, the exhibition apparatus 20 can play the Japanese sound or subtitle file in the divided DCP 2 together with the English picture file in the divided DCP 1 on the basis of the CPL 2 or 3 in the divided DCP 2. Thus, by additionally distributing the divided DCP 2 for the Japanese version to the exhibition apparatus 20 that has obtained the divided DCP 1 for the English version, it becomes possible at the exhibition apparatus 20 to play the digital cinema in the Japanese version as well as in the English version. Such extendibility of language versions applies to other languages as well as Japanese.

It has hitherto been the case to create DCPs individually for language versions, or to include content files of all language versions in one DCP and to use a CPL in which content files of various language versions are associated. In contrast, according to this embodiment, a plurality of divided DCPs are created on a per-language-version basis as described above, so that advantageously, it is possible to pick up and use only a divided DCP for an intended language version among the plurality of divided DCPS. Furthermore, it becomes readily possible to take measures such as adding an available language version afterward.

In the example shown in FIG. 5, the divided DCP 2 for the Japanese version supports both a Japanese sound version and a Japanese subtitle version. However, without limitation to this example, a divided DCP may include either the CPL 2 for the Japanese sound version or the CPL 3 for the Japanese subtitle version and either the Japanese sound file or the Japanese subtitle file. In this case, a divided DCP for the Japanese sound version and a divided DCP for the Japanese subtitle version may be provided separately. Alternatively, a Japanese content file (sound file or subtitle file) may be included in the divided DCP 1 for the English version instead of the divided DCP 2 for the Japanese version, while including only an asset map, VI, and CPL 2 or CPL 3 for the Japanese version in the divided DCP 2 for the Japanese version. Also in this case, on the basis of CPL 2 or CPL 3 in the divided DCP 2, it is possible to play the Japanese version of the digital cinema by playing the Japanese sound file or subtitle file together with the English picture file. Furthermore, if the English picture file is included in the CPL 2 for the Japanese version together with the Japanese sound file and subtitle file, the picture file is included in duplicates in the divided DCP 1 for the English version and CPL 2 for the Japanese version, but this scheme may be used. The allocation of content files to individual divided DCPs can be determined in various manners according to intensions of a cinema distribution company.

Next, an example of scheme of division, shown in FIG. 6, will be described. FIG. 6 shows an example of a division scheme in which some reels constituting a digital cinema are replaced so that scenes suitable for individual exhibition sites can be produced. For example, in accordance with a regulation, religion, contracts among companies (advertisement, copyright, etc.), market needs, or other factors in a country whether a digital cinema is to be exhibited, in some cases, a replacement version in which some scenes in a original version of the digital cinema are removed or replaced is created. In such cases, the division scheme shown in FIG. 6 is effective since partial replacement of scenes is allowed.

In the example shown in FIG. 6, for one digital cinema, a divided DCP 1 for an original version and divided DCPs 2, 3, . . . for a plurality of replacement versions are created. The divided DCP 1 for the original version includes content files (e.g., picture file and sound file) corresponding to the original version of the digital cinema, a CPL 1 for the original version, associating the content files of the original version with each other, an asset map, a PL, and a VI 1 in which division version information (serial number "1") for the divided DCP 1 is described.

The divided DCP 2 for the replacement version includes content files (e.g., picture file, sound file, and subtitle file) corresponding to differences between the original version and replacement version of the digital cinema, a CPL 2 for the replacement version, associating the content files corresponding to the replacement version with each other, an asset map, a PL, and a VI 1 in which division version information (serial number "2") for the divided DCP 2 is described. As described above, the divided DCP 2 for the replacement version includes content files corresponding to differences between the original version and the replacement version as content files for replacement scenes, and does not include content files of scenes that are not replaced. Thus, since it suffices for the divided DCP 2 for the replacement version to include minimum content files corresponding to the differences, it is possible to reduce the amount of data of the divided DCP 2 for the replacement version.

Regarding the replacement scenes of the digital cinema, the CPL 2 for the replacement version associates the content files corresponding to the differences, included in the divided DCP 2 for the replacement version, and regarding the scenes that are not replaced, the CPL 2 for the replacement version associates the content files of the original version, included in the divided DCP 1 for the original version. Thus, simply by additionally distributing the divided DCP 2 for the replacement version to the exhibition apparatus 20 having obtained the divided DCP 1 for the original version, it becomes possible to play the replacement version of the digital cinema.

Figure 7A:
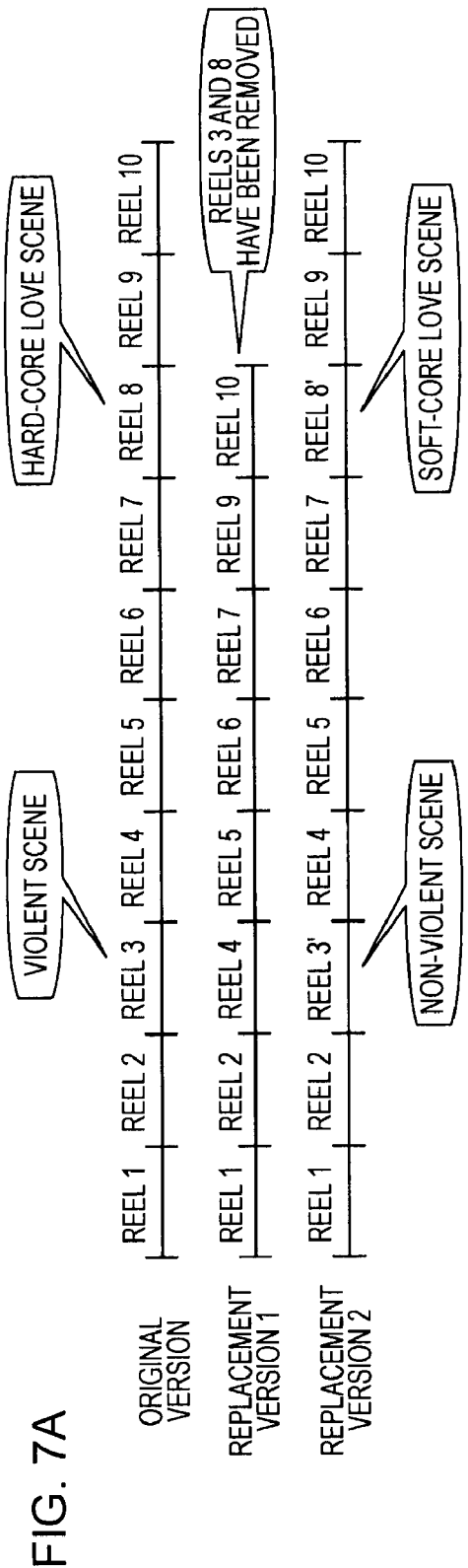
FIGS. 7A and 7B are diagrams for explaining specific examples of replacement of scenes according to the embodiment.
Figure 7B:
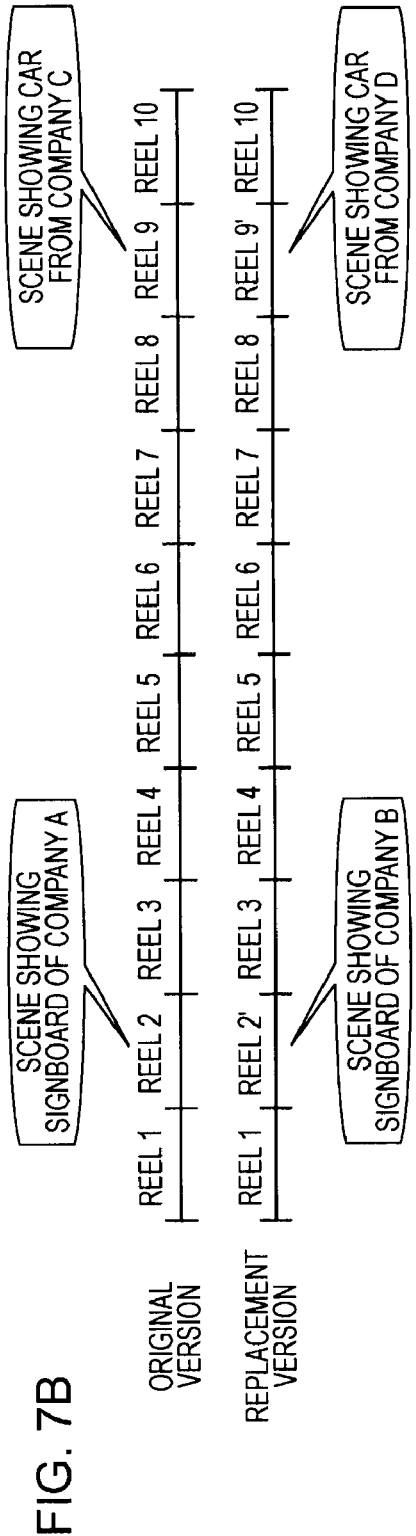

Now, a specific example of replacement of scenes in a digital cinema will be described with reference to FIGS. 7A and 7B. For example, as shown in FIG. 7A, the original version of a digital cinema is composed of ten reels 1 to 10, the reel 3 of the original version includes a violent scene, and the reel 8 of the original version includes a hard-core love scene, and the scenes of the reels 3 and 8 could violate regulations in some countries. In this case, it is possible to create a replacement version 1 in which the reels 3 and 8 including the problematic scenes in the original version have been removed. Alternatively, it is possible to create a replacement version 2 in which the reel 3 is replaced by a reel 3' including a non-violent scene and the reel 8 is replaced by a reel 8' including a soft-core love scene.

Now, an example where divided DCPs individually corresponding to the original version, the replacement version 1, and the replacement version 2 as shown in FIG. 6 will be described. The divided DCP for the original version includes the CPL 1 for the original version, and content files (picture files, sound files, and so forth) of all the reels 1 to 10 of the original version. Of these, the CPL 1 for the original version associates with each other content files of the original version in the divided DCP 1 for each of the ten reels 1 to 10.

The divided DCP 2 for the replacement version 1 includes the CPL 2 for the replacement version 1. The CPL 2 for the replacement version 1 associates content files of the original version for reels 1, 2, 4 to 7, 9, and 10, excluding the reels 3 and 8. By using the divided DCP 2 including the CPL 2 for the replacement version 1, the exhibition apparatus 20 can play the replacement version 1, in which the problematic reels 3 and 8 among the reels 1 to 10 of the original version have been removed. As described above, in order to remove some scenes in the original version, after the divided DCP 1 for the original version is distributed, a CPL 2 that associates content files of reels other than the problematic reels 3 and 8 is created, and the divided DCP 2 for the replacement version 1, including the CPL 2, is distributed. Since the divided DCP 2 includes the CPL 2 for the replacement version 1 but does not include content files, the amount of data is very small.

The divided DCP 3 for the replacement version 2 includes a CPL 3 for the replacement version 2, and content of the replacement scenes 3' and 8'. The CPL 3 for the replacement version 2 associates content files of the original version for the reels 1, 2, 4 to 7, 9, and 10, and associates content files of the replacement version for the reels 3' and 8'. By using the divided DCP 3 including the CPL 3 for the replacement version 2, the exhibition apparatus 20 can play the replacement version 2, in which the problematic reels 3 and 8 among the reels 1 to 10 of the original version have been replaced by the acceptable reels 3' and 8'. As described above, in order to replace some scenes in the original version after distributing the divided DCP 1 for the original version, content files for the replacement reels 3' and 8' are created, a CPL 3 for the replacement version 2, which associates the content files of the replacement reels 3' and (' with the content files of the original version for the other reels 1, 2, 4 to 7, 9, and 10 included in the divided DCP 1 for the original version is created, and a divided DCP 3 for the replacement version 2, including the content for replacement and the CPL 3 is distributed.

Next, an example shown in FIG. 7B will be described. As shown in FIG. 7B, divided DCPs can be used for advertisement by changing some reels in the original version. For example, a case will be considered where the reel 2 in the original version includes a scene showing a signboard of a company A and the reel 9 including a scene showing a car from a company C. In this case, it is possible to create a replacement version in which the reel 2 is replaced by a reel 2' including a scene showing a signboard of a company B and the reel 9 is replaced by a reel 9' including a scene showing a car from a company D. That is, a cinema production company or distribution company can change scenes that can serve as advertisements for companies depending on exhibition periods or exhibition sites in accordance with business contracts.

Also in the case where the divided DCPs are used for advertisements, similarly to the case described earlier, a divided DCP 1 for the original version, including content files of the original version and a CPL 1 for the original version, and a divided DCP for a replacement version, including content files corresponding to differences between the original version and the replacement version and a CPL 2 for the replacement version. The CPL 1 for the original version associates the content files of the reels 1 to 10 for the original version. The CPL 2 for the replacement version associates the content files of the reels 1, 3 to 8, and 10 of the original version and the content files of the reels 2' and 9' of the replacement version. By creating a divided DCP for a replacement version as described above, advertisement scenes can be suitably changed depending on exhibition periods or exhibition sites as described earlier.

As described with reference to FIGS. 7A and 7B, according to this embodiment, by using divided DCPs, it becomes possible to divide scenes of an original version of a digital cinema in advance and to replace scenes in the original version with other scenes as needed. Thus, it becomes readily possible to localize a digital cinema, replace advertisements, and so forth. Furthermore, since a divided DCP for a replacement version does not include any content files or only includes content files corresponding to differences from the original version, the amount of data of the DCP for the replacement version is small. Therefore, when the divided DCP for the replacement version is distributed, the capacity of the removable recording medium can be saved, and it also becomes possible to distribute the divided DCP via the network 2.

Now, the configurations of the creating server 10 and the exhibition apparatus 20 for achieving digital cinema distribution and exhibition using divided DCPs as described above will be described.

5. Hardware Configuration of the Creating Server 10 (Digital-Cinema Creating Apparatus)

Figure 8:
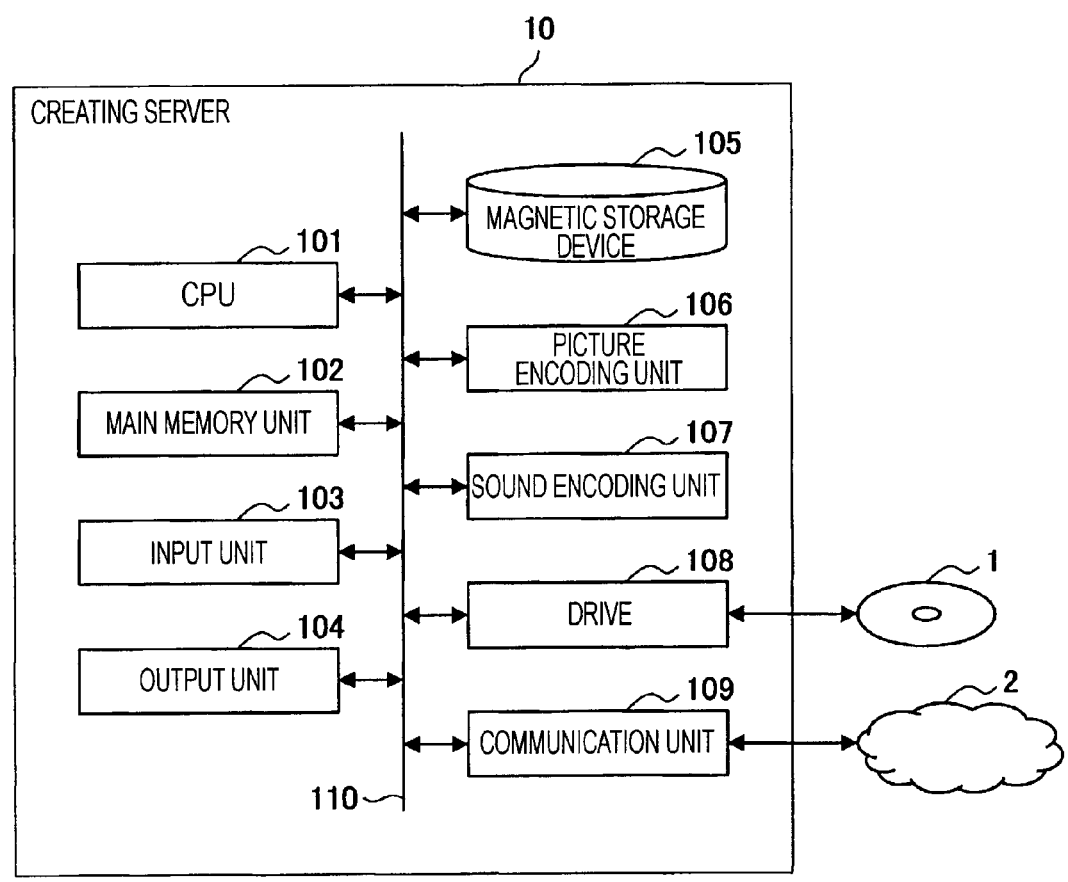
FIG. 8 is a diagram showing the configuration of a creating server according to the embodiment.

First, the hardware configuration of the creating server 10 according to this embodiment will be described with reference to FIG. 8. FIG. 8 is a diagram showing the configuration of the creating server 10 according to this embodiment.

For example, as shown in FIG. 8, the creating server 10 includes a central processing unit (CPU) 101, a main memory unit 102, an input unit 103, an output unit 104, a magnetic storage device 105, a picture encoding unit 106, a sound encoding unit 107 a drive 108, a communication unit 109, and a local bus 110 connecting these components with each other.

The CPU 101 functions as a processing unit and a control unit to control the components of the creating server 10. The CPU 101 executes various types of processing according to programs stored in the main memory unit 102 or programs loaded from the magnetic storage device 105 to the main memory unit 102. The main memory unit 102 can be formed of various types of memory, such as a read-only memory (ROM) or a random access memory (RAM), and it stores programs used by the CPU 101, parameters that changes during execution of the programs, and so forth. Furthermore, the main memory unit 102 also functions as a buffer for alleviating concentration of accesses from the CPU 101 to the magnetic storage device 105.

The input unit 103 is formed of, for example, an input unit such as a mouse, a keyboard, a touch panel, a button, a switch, or a lever, an input control circuit that generates an input signal in accordance with a user's operation at the input unit and outputs the input signal to the CPU 101, and so forth. The user can input various types of data to the creating server 10 or to instruct the creating server 10 to perform processing operations by operating the input unit 103. The output unit 104 is formed of, for example, a display apparatus such as a cathode-ray tube (CRT) display apparatus, a display unit such as a liquid crystal display (LCD) panel, and a sound output unit such as a speaker. For example, the output unit 104 displays text or image representing various types of information, such as pictures of content that is played, or outputs sound such as sound of the content that is played.

The magnetic storage device 105 is an example of a data storage device, and is formed of, for example, a hard disk drive (HDD) including a hard disk as a storage medium. The magnetic storage device 105 stores various types of data, such as programs executed by the CPU 101, content of digital cinemas, DCP, log, and configuration information.

The picture encoding unit 106 encodes picture data representing picture materials of a digital cinema to compress the picture data according to a predetermined compression encoding scheme (e.g., Joint Photographic Experts Group (JPEG) 2000), thereby generating compressed picture data in the predetermined format. The sound encoding unit 107 encodes sound data of sound materials of a digital cinema to compress the sound data according to a predetermined compression encoding scheme (e.g., WAV), thereby generating compressed sound data in the predetermined format. The picture encoding unit 106 and the sound encoding unit 107 can also encrypt the picture data and sound data using key information.

On the drive 108, the removable recording medium 1 is mounted, and the drive 108 reads from or writes to the recording medium 1 various types of data such as material content of digital cinemas, DCPs, and configuration information. More specifically, the drive 108 reads data recorded on the removable recording medium 1, and supplies the data to the main memory unit 102 connected via the local bus 110. The CPU 101 stores the data as needed, for example, in the magnetic storage device 105. Furthermore, the drive 108 receives data stored in the main memory unit 102, the magnetic storage device 105, and so forth, newly generated data, or data obtained from external apparatuses from the CPU 101, and writes the data to the removable recording medium 1. With the drive 108, it is possible to write divided DCPs created at the creating server 10 to the removable recording medium 1, or to read divided DCPs stored on the removable recording medium 1.

The communication unit 109 is a communication interface that is formed of, for example, a communication device for connecting the creating server 10 to the network 2. The communication unit 109 exchanges various types of data, such as divided DCPs, via the network 2 with external apparatuses, such as the exhibition apparatus 20.

Figure 9:
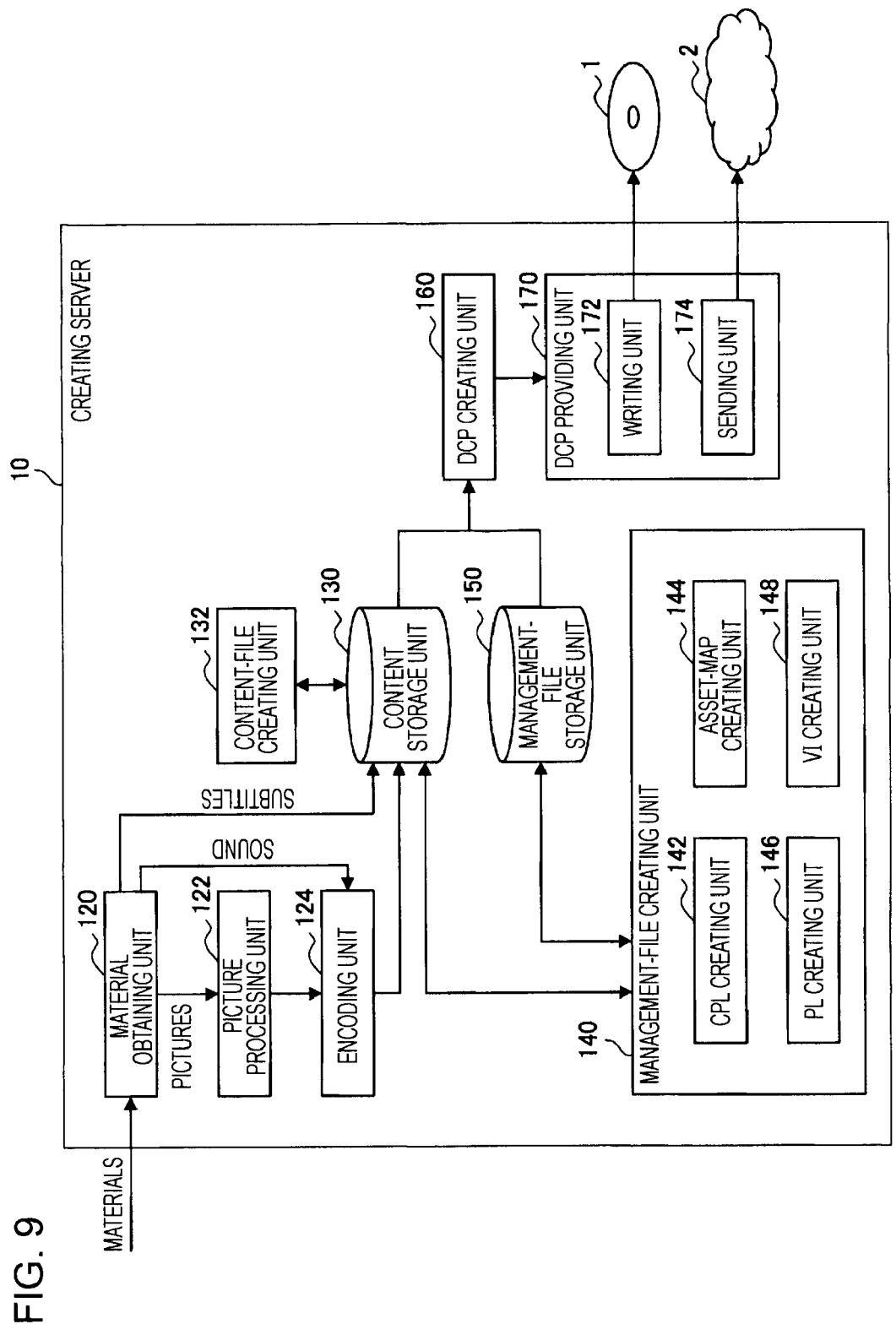
FIG. 9 is a diagram showing the functional configuration of the creating server according to the embodiment.

Next, the functional configuration of the creating server 10 according to this embodiment will be described with reference to FIG. 9. FIG. 9 shows the functional configuration of the creating server 10 according to this embodiment.

As shown in FIG. 9, the creating server 10 includes a material obtaining unit, a picture processing unit 122, an encoding unit 124, a content storage unit 130, a content-file creating unit 132, a management-file creating unit 140, a management-file storage unit 150, a DCP creating unit 160, and a DCP providing unit 170.

The material obtaining unit 120 obtains picture data, sound data, subtitle data, and so forth that serve as material data of a digital cinema. For example, the material data is data recorded by a cinema production company or the like, or data created using computer graphics (CG) techniques. For example, the material data is delivered on the removable recording medium 1, such as an HD video tape, an HDD, or a film, from a cinema production company or the like to a cinema distribution company. The material obtaining unit 120 obtains the material data by reading the material data from the removable recording medium 1 mounted on the creating server 10, or by receiving the material data via the network 2.

The picture processing unit 122 executes predetermined picture processing on picture material data obtained by the material obtaining unit 120. For example, the picture processing includes conversion into a 12-bit XYZ color space using a three-dimensional color space coordinate conversion engine, file format conversion, and so forth. Furthermore, predetermined sound processing may be executed on sound material data by a sound processing unit (not shown).

The encoding unit 124 is formed of, for example, the picture encoding unit 106 and the sound encoding unit 107 described earlier. The encoding unit 124 compresses picture material data that has undergone the picture processing by the picture processing unit 122 and sound material data obtained by the material obtaining unit 120 according to predetermined compression encoding schemes (e.g., JPEG 2000 for pictures and WAV for sound). Furthermore, the encoding unit 124 encrypts the compressed picture data and sound data, and generates key information for decrypting the encrypted picture data and sound data.

The content storage unit 130 is formed of, for example, the magnetic storage device 105 described earlier, and it stores content files (picture, sound, subtitles, and so forth) of digital cinemas. The content storage unit 130 stores picture data and sound data compressed through encoding by the encoding unit 124, subtitle data, and content files (MXF files) created by the content-file creating unit 132.

The content-file creating unit 132 processes the picture and sound data compressed through encoding and subtitle data, thereby creating a picture track file (picture file), a sound track file (sound file), and/or a subtitle track file (subtitle file) for each reel of the digital cinema.

More specifically, the content-file creating unit 132 wraps the compressed picture and sound data on a reel-by-reel basis to create a picture track file (MXF file) and a sound track file (MXF file) on a reel-by-reel basis). That is, in the case of picture data, since individual pictures are represented in separate files, the files are integrated on a reel-by-reel basis to create an MXF file. This task is referred to as "wrapping". Furthermore, the sound data has WAV files for individual channels, so that the files are integrated on a reel-by-reel basis to create one MXF file. Furthermore, when subtitle data exists, the content-file creating unit 132 may wrap the subtitle data according to a predetermined format (XML format, MXF format, or the like as defined by SMPTE) to create a subtitle track file. The picture file, sound file, and subtitle file created as described above are stored in the content storage unit 130.

The management-file creating unit 140 creates a management file for managing content files in a DCP. For example, the management-file creating unit 140 includes a CPL creating unit 142 that creates a composition playlist (CPL), an asset-map creating unit 144 that creates an asset map, a PL creating unit 146 that creates a packing list (PL), and a VI creating unit 148 that creates a volume index (VI).

The CPL creating unit 142 creates a plurality of CPLs for individual exhibition versions of one digital cinema. Each of the CPLs associates content files (a picture track file, a sound track file, and/or a subtitle track file) corresponding to the relevant exhibition version, on a reel-by-reel basis. In a case where a DCP for one digital cinema is divided into a plurality of divided DCPs for individual exhibition versions, the CPL creating unit 142 creates a CPL for each exhibition version, with each CPL including at least one divided DCP. For example, in a case where a CPL is created for each language version as shown in FIG. 5, the CPL creating unit 142 creates a CPL 1 for an English version, a CPL 2 for a Japanese sound version, a CPL 3 for a Japanese subtitle version, and so forth. In the case where a CPL for an original version and a CPL for a replacement version are created as shown in FIG. 6, the CPL creating unit 142 creates a CPL 1 for the original version and a CPL 2 for the replacement version.

Furthermore, when a plurality of divided DCPs are created, the asset-map creating unit 144 creates one asset map commonly included in a plurality of divided DCPs, the PL creating unit 146 creates one PL commonly included in a plurality of divided DCPs, and the VI creating unit 148 creates a plurality of VIs in which division index information (e.g., serial numbers) different among individual divided DCPs is described. The content of the asset map, PL, and VI in the case where a DCP is divided into a plurality of divided DCPs has been described earlier, so that detailed description thereof will be omitted. The management files created by the management-file creating unit 140 as described above, i.e., the CPL, asset map, PL, and VI, are stored in the management-file storage unit 150.

The DCP creating unit 160 creates one DCP or a plurality of divided DCPs. At this time, regarding the same digital cinema, the DCP creating unit 160 reads content files (picture track file, sound track file, and/or subtitle track file) stored in the content storage unit 130 and the management files (asset map, VI, PL, and CPL) stored in the management-file storage unit 150 as needed, and packs the files to create a DCP or divided DCPs.

The DCP creating unit 160 creates DCPs individually for exhibition versions of the digital cinema. As described earlier, each divided DCP includes at least one CPL corresponding to the relevant exhibition version. For example, in the case where divided DCPs are created for the individual language versions as shown in FIG. 5, the DCP creating unit 160 creates a divided DCP 1 for an English version, including a CPL 1 for the English version, and a divided DCP 2 for a Japanese version, including CPLs 2 and 3 for the Japanese version. In the case where divided DCPs for an original version and a replacement version are created as shown in FIG. 6, the DCP creating unit 160 creates a divided DCP 1 for an original version including a CPL 1 for the original version, and a divided DCP 2 for a replacement version, including a CPL 2 for a replacement version.

Furthermore, in the case where a divided DCP for a replacement version is created, in the divided DCP for the replacement version, the DCP creating unit 160 includes a CPL for the replacement version, and content files corresponding to differences between the original version and the replacement version among content files associated by the CPL for the replacement version. Thus, the amount of data of the divided DCP for the replacement version can be minimized. Furthermore, by adding the divided DCP for the replacement version at the exhibition apparatus 20, it becomes possible to play the replacement version of the digital cinema. However, without limitation to this example, it suffices for the divided DCP for the replacement version to include at least a CPL for the replacement version, and content files for the replacement version may be included in a separate divided DCP.

Furthermore, the DCP creating unit 160 may create a plurality of divided DCPs simultaneously for one digital cinema, and allocate a plurality of content files and a plurality of CPLs to individual divided DCPs on a per-exhibition-version basis. Alternatively, the DCP creating unit 160 may create main-divided DCPs for main exhibition versions (e.g., divided DCP for an English version and an original version), and then additionally create sub-divided DCPs for other exhibition versions (e.g., divided DCPs for a Japanese version and a replacement version) as needed. When sub-divided DCPs are created additionally, content files corresponding to differences between the main exhibition versions and other exhibition versions are included in the sub-divided DCPs, so that inclusion of duplicate content files among the plurality of divided DCPs can be prevented. Furthermore, in order to prevent inclusion of duplicate content files, it is possible to include content files that are associated commonly by a plurality of CPLs (e.g., the picture file for the English version shown in FIG. 5) only in main-divided DCPs and not include such content files in sub-divided DCPs.

The DCP providing unit 170 provides the DCP or divided DCPs created as described above to the exhibition apparatus 20 via the removable recording medium 1, the network 2, or the like. The DCP providing unit 170 includes a writing unit 172 that provides a DCP or divided DCPs to the exhibition apparatus 20 via the removable recording medium 1, and a sending unit that provides a DCP or divided DCPs to the exhibition apparatus 20 via the network 2.

The writing unit 172 is formed of, for example, the drive 108 and the CPU 101 that controls the drive 108, described earlier. The writing unit 172 writes a DCP or divided DCPs created by the DCP creating unit 160 to the removable recording medium 1 mounted on the creating server 10. By transporting the removable recording medium 1 to a theater and mounting it on the exhibition apparatus 20, the DCP or divided DCPs can be provided from the creating server 10 to the exhibition apparatus 20. With the removable recording medium 1 having a sufficient storage capacity, a DCP or divided DCP having a relatively large amount of data can be provided to the exhibition apparatus 20.

The sending unit 174 is formed of, for example, the communication unit 109 and the CPU 101 that controls the communication unit 109, described earlier. The sending unit 174 sends a DCP or divided DCPs created by the DCP creating unit 160 to the exhibition apparatus 20 via the network 2. Thus, it is possible to quickly and readily provide a DCP or divided DCPs having a relatively small amount of data from the creating server 10 to the exhibition apparatus 20. For example, the divided DCP for the replacement version, described earlier, which includes content files corresponding to difference from the original version, has a small amount of data, so that the divided DCP can be sent suitably via the network 2. Accordingly, the exhibition apparatus 20 can quickly obtain the divided DCP for the replacement version from the creating server 10 and play the replacement version of the digital cinema. Furthermore, in the case where the divided DCP for the replacement version includes only management files such as the CPL for the replacement version and the asset map and does not include content files, the amount of data is very small, so that the divided DCP can be transferred suitably via the network 2.

6. Digital-Cinema Creating Method

Next, a digital-cinema creating method in which a plurality of divided DCPs for one digital cinema are created using the creating server 10 described above will be described.

Figure 10:
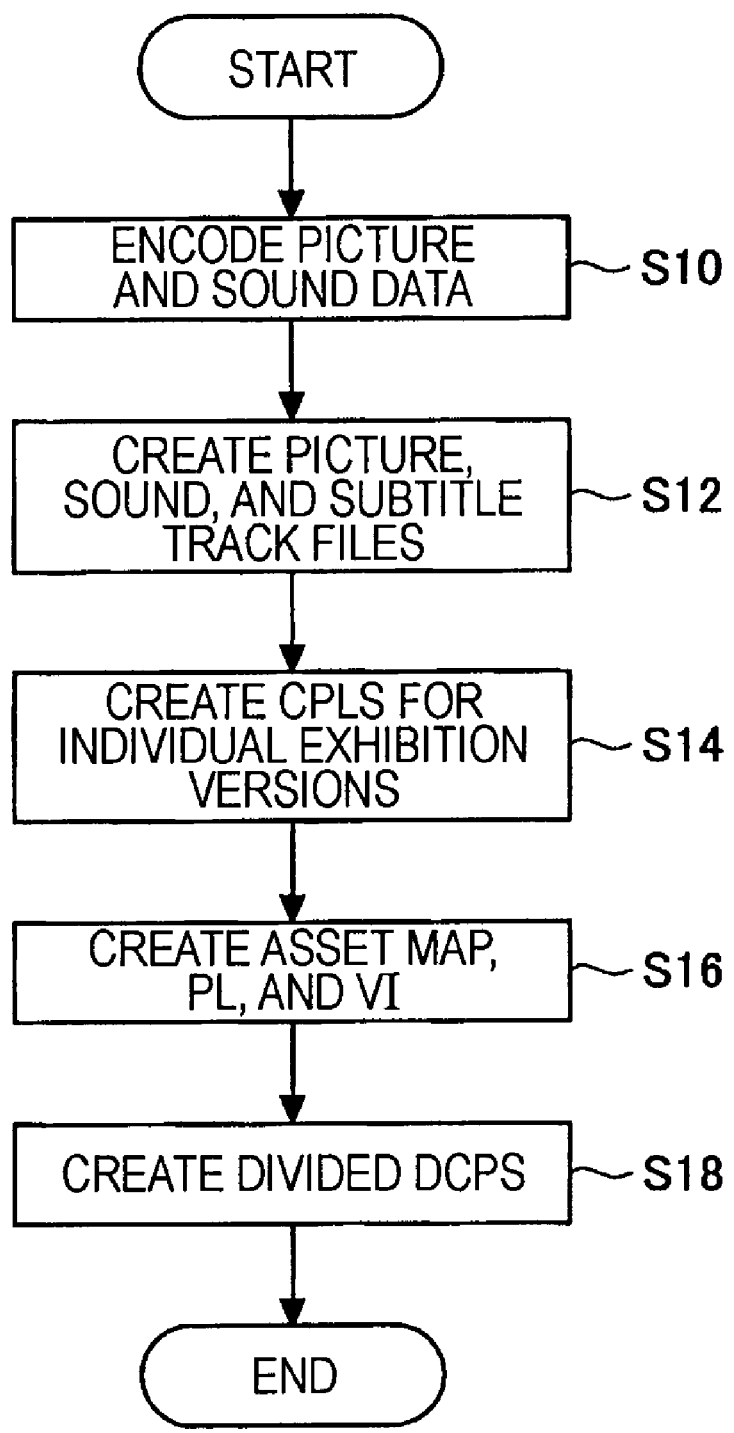
FIG. 10 is a flowchart showing an example of a digital-cinema creating method according to the embodiment.

Referring first to FIG. 10, a method in which a plurality of divided DCPs are created directly without creating a DCP corresponding to all exhibition versions of one digital cinema (a parent DCP serving as a source of division) will be described.

As shown in FIG. 10, first, the creating server 10 executes suitable picture processing on a plurality of pieces of picture data serving as material data of a digital cinema, and encodes the picture data and sound data individually according to predetermined formats to compress the picture data and the sound data (step S10). For example, the picture data is encoded according to the JPEG 2000 format and the sound data is encoded according to the WAV format.

Then, the creating server 10 individually wraps the encoded picture data and sound data for one or more reels on a per-reel basis, thereby creating picture track files and sound track files (step S12). For example, the file format of the picture track files and the sound track files is the MXF file format. Furthermore, if subtitle data exists, the creating server 10 wraps the subtitle data according to a predetermined format (e.g., the XML or MXF format defined by SMPTE), thereby creating a subtitle track file. As described earlier, the subtitle data is composed of either font data and XML data or pieces of PNG data for individual subtitle track files and XML data. These components of subtitle data can also be integrated in to a single file according to the MXF format, similarly to the picture data and the sound data. As described above, in step S12, picture, sound, and subtitle track files are created on a per-reel basis.

Then, the creating server 10 creates CPLs for individual exhibition versions of the digital cinema (step S14). Each of the CPLs, created on a per-exhibition-version basis, associates picture track files, sound track files, and/or subtitle track files (content files) of all the reels constituting the corresponding exhibition version.

Furthermore, the creating server 10 creates an asset map and a PL for all the files (content files, VIs, a CPL, and so forth) included in the DCP (step S16). At this time, if a plurality of CPLs have been created, the creating server 10 creates an asset map and a PL for all the CPLs. Furthermore, the creating server 10 determines the division number (the number of volumes) of the DCP on the basis of user's input or automatically by a predetermined method, and creates a number of VIs corresponding to the division number. For example, when the DCP is divided into ten, divided DCPs, ten VIs individually describing serial numbers 1 to 10 are created as division index information.

Then, the creating server 10 creates divided DCPs for the individual exhibition versions, and allocates the CPLs and content files to the divided DCPs (step S18). At this time, the creating server 10 allocates the CPLs so that each of the divided DCPs includes at least one CPL. Furthermore, the same asset map is commonly included in all the divided DCPs, and VIs having mutually different division index information are allocated to the individual divided DCPs. Furthermore, in order to reduce the total amount of data, content files and PL commonly referred to from a plurality of CPLs are included in a main-divided DCP (e.g., a divided DCP for an original version), and content files corresponding to differences between the original version and a replacement version are included in a sub-divided DCP (e.g., a divided DCP for a replacement version).

In this manner, it is possible to directly create divided DCPs for individual exhibition versions of a digital cinema without creating a parent DCP including all the content files.

Next, a method in which a parent DCP is first created and then the parent DCP is divided to create a plurality of divided DCPs will be described.

Figure 11:
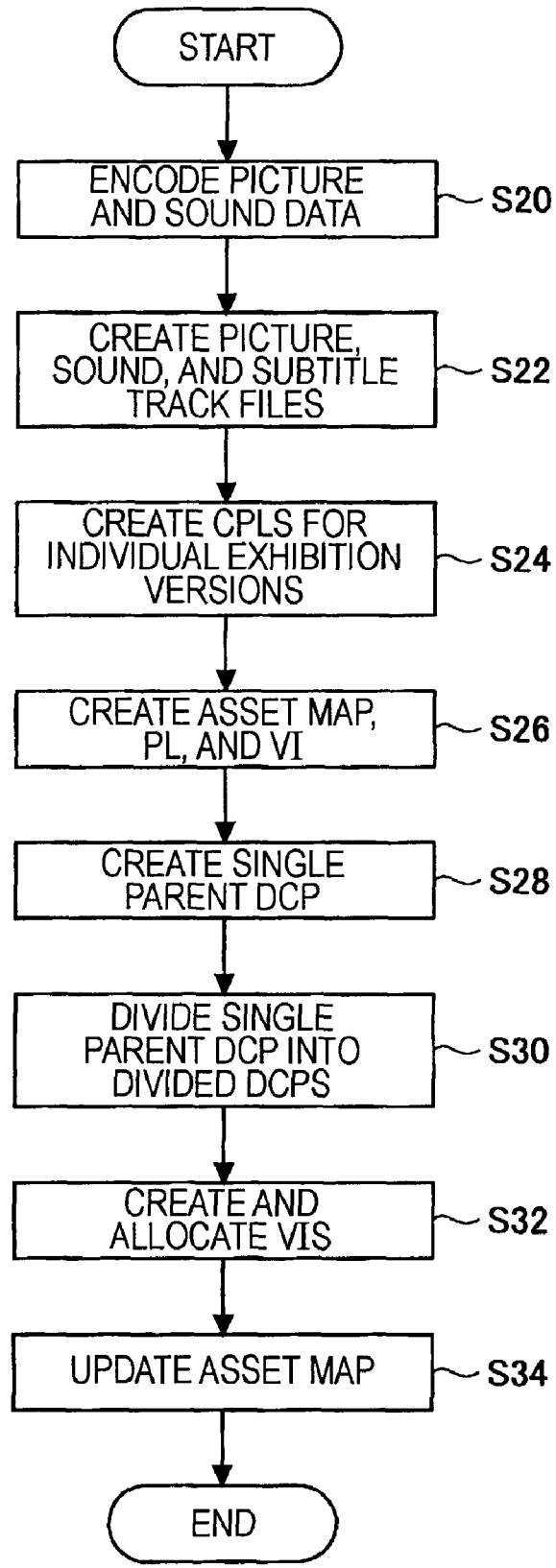
FIG. 11 is a flowchart showing another example of a digital-cinema creating method according to the embodiment.

As shown in FIG. 11, the creating server 10 first encodes picture and sound data (step S20), then creates picture track files and sound track files (step S22), and then creates CPLs for the individual exhibition versions of the digital cinema (step S24). These steps S20, S22, and S24 correspond to steps S10, S12, and S14 described with reference to FIG. 10, so that detailed description thereof will be omitted.

Then, similarly to the related art, the creating server 10 creates an asset map, a PL, and VIs for all the files constituting the digital cinema (step S26), creates a DCP as one volume (a parent DCP serving as a source of division) (step S28), and includes the asset map, PL, VIs, and all the content files in the parent DCP.

Then, the creating server 10 divides the single parent DCP into a plurality of DCPs (a plurality of volumes) corresponding to the individual exhibition versions (step S30). At this time, the parent DCP is divided into groups of content files associated by the CPLs of the individual exhibition versions. That is, to each of the divided DCPs, the CPL of the corresponding exhibition version and content files associated by the CPL are allocated. At this time, the same asset map is commonly included in all the divided DCPs. Furthermore, for the purpose of efficient allocation of data, content files and PL that are commonly referred to from a plurality of CPLs are allocated to a main-divided DCP (e.g., a divided DCP for an original version), and content files corresponding to differences between the original version and a replacement version are allocated to a sub-divided DCP (e.g., a DCP for a replacement version).

Furthermore, the creating server 10 creates a number of VIs having mutually different division index information, corresponding to the number of divided DCPs (i.e., the division number), and allocates the VIs individually to the divided DCPs (step S32). Then, the creating server 10 additionally writes division index information (serial numbers) of the divided DCPs to which the files have been allocated, in the asset map included in each of the divided DCPs, thereby updating the asset map (step S34).

In this manner, a parent DCP of a digital cinema is first created, and then the parent DCP is divided on a per-exhibition-version basis to create a plurality of divided DCPs.

7. Configuration of the Exhibition Apparatus 20 (Digital-Cinema Processing and Playing Apparatus)

Figure 12:
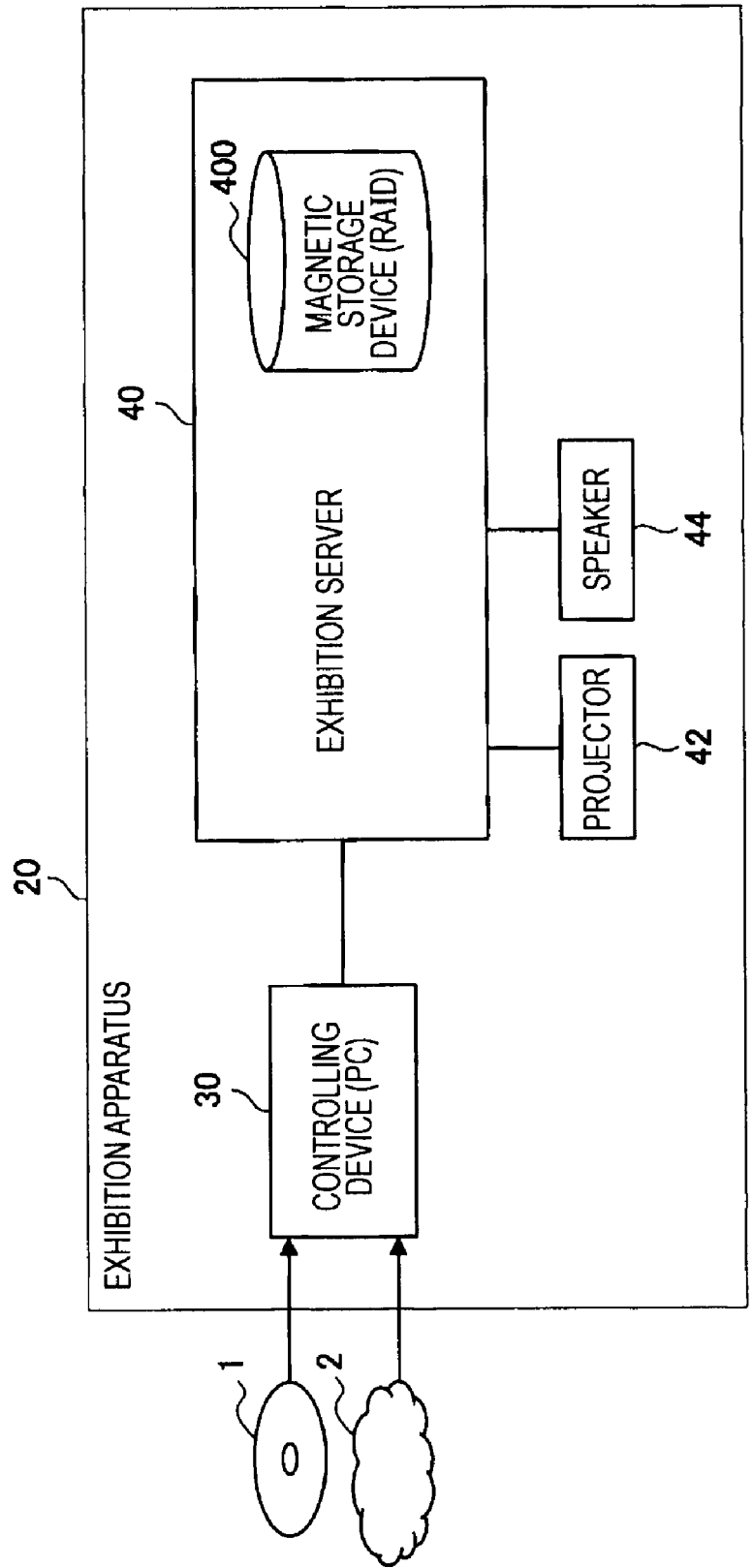
FIG. 12 is a diagram showing the overall configuration of an exhibition apparatus according to the embodiment.

Next, the overall configuration of the exhibition apparatus 20 according to this embodiment will be described with reference to FIG. 12. FIG. 12 is a diagram showing the overall configuration of the exhibition apparatus 20 according to this embodiment.

For example, as shown in FIG. 12, the exhibition apparatus 20 includes a controlling device 30 that controls an exhibition server 40, the exhibition server 40 that plays a digital cinema, a projector 42 that projects played pictures onto a screen, a speaker 44 that outputs played sound, and a magnetic storage device 400 that stores the DCP or divided DCPs described earlier.

For example, the controlling device 30 is formed of, for example, a personal computer or the like. The controlling device 30 is connected to the exhibition server 40 and controls the operation of the exhibition server 40. The controlling device 30 controls processing for obtaining a DCP or divided DCPs from the creating server 10 via the removable recording medium 1 or the network 2, and ingesting the DCP or divided DCPs in the magnetic storage device 400 of the exhibition server 40.

The magnetic storage device 400 is an example of a storage device that stores data of a digital cinema, and is formed of, for example, an HDD. Since the amount of data of a digital cinema is generally large, an external storage device having a large capacity sufficient to store data of a digital cinema is used as the magnetic storage device 400. From this viewpoint, a storage device that uses redundant arrays of inexpensive disks (RAID), i.e., a RAID device, is often used as the magnetic storage device 400. RAID makes it possible to manage a plurality of hard disks collectively as a single hard disk. The magnetic storage device 400 stores data of the DCP or divided DCPs ingested in the exhibition server 40. At this time, if data of a plurality of digital cinemas exists, the exhibition server 40 stores data of the individual digital cinemas in different directories. Without limitation to the example of the magnetic storage device 400 described above, a storage device that uses an optical disk, semiconductor memory, or the like having a large capacity may be used to store DCPs of digital cinemas.

The exhibition server 40 is a digital-cinema playing apparatus including a playing unit, such as a decoder. The exhibition server 40 plays content (picture, sound, and subtitle) of a digital cinema stored in the magnetic storage device 400. At the time of playing, on the basis of the CPL described earlier, the exhibition server 40 reads and plays appropriate picture, sound, and subtitle data from the magnetic storage device 400 at appropriate timing. the exhibition server 40 outputs the played picture and subtitle data to the projector 42, and outputs the played sound data to the speaker 44, whereby the digital cinema is exhibited at a theater.

Figure 13:
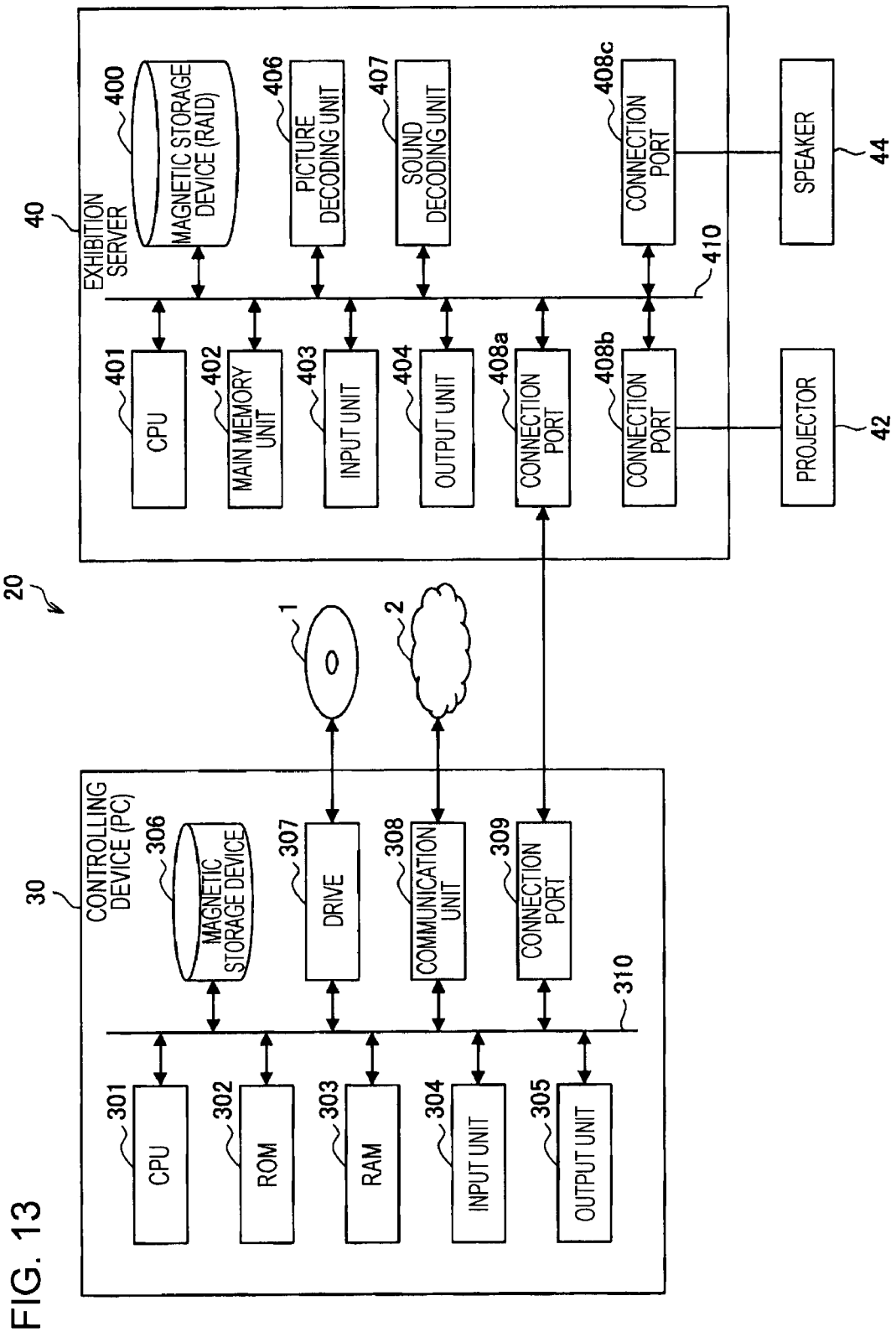
FIG. 13 is a diagram showing the configurations of a controlling device and an exhibition server in the exhibition apparatus according to the embodiment.

Next, the hardware configurations of the controlling device 30 and the exhibition server 40 in the exhibition apparatus 20 described above will be described in detail with reference to FIG. 13. FIG. 13 is a diagram showing the configurations of the controlling device 30 and the exhibition server 40 in the exhibition apparatus 20 according to this embodiment.

As shown in FIG. 13, the controlling device 30 is configured similarly to an information processing apparatus such as an ordinary personal computer. For example, the controlling device 30 includes a CPU 301, a ROM 302, a RAM 303, an input unit 304, an output unit 305, a magnetic storage device 306, a drive 307, a communication unit 308, a connection port 309, and a local bus 310 interconnecting these components.

The CPU 301 functions as a processing unit and a control unit to control the components of the controlling device 30. The CPU 301 executes various types of processing according to programs stored in the ROM 302 or programs loaded from the magnetic storage device 306 to the RAM 303. The ROM 302 stores programs executed by the CPU 301, operation parameters, and so forth. The RAM 303 temporarily stores programs executed by the CPU 301, parameters that change during execution of the programs, and so forth.

The input unit 304 is formed of, for example, an input section, such as a mouse, a keyboard, a touch panel, a button, a switch, or a lever, and an input control circuit that generates an input signal in accordance with a user's operation at the input section and outputs the input signal to the CPU 301. The user can input various types of data to the controlling device 30 or to instruct the controlling device 30 to perform processing operations by operating the input unit 304. The output unit 305 is formed of, for example, a display device, such as a cathode-ray tube (CRT) display or as a liquid crystal display (LCD), and a sound output device, such as a speaker. For example, the output unit 305 displays text or image representing various types of information, such as pictures of played content, or outputs sound, such as sound of played content.

The magnetic storage device 306 is an example of a data storage device, and is formed of, for example, an HDD including a hard disk as a storage medium. The magnetic storage device 306 stores various types of data, such as programs executed by the CPU 301, content of digital cinemas, DCPs, log information, and configuration information.

On the drive 307, the removable recording medium 1 is mounted as needed, and the drive 307 reads from or writes to the recording medium 1 various types of data, such as material content of digital cinemas, DCPs, and configuration information. More specifically, the drive 307 reads data recorded on the removable recording medium 1, and supplies the data to the RAM 303 connected via the local bus 310. The CPU 301 stores the data as needed, for example, in the magnetic storage device 306. Furthermore, the drive 307 receives data stored in the ROM 302, the magnetic storage device 306, and so forth, newly generated data, or data obtained from external apparatuses from the CPU 301, and writes the data to the removable recording medium 1. With the drive 307, it is possible to read a DCP or divided DCPs stored on the removable recording medium 1.

The communication unit 308 is a communication interface that is formed of, for example, a communication device for connecting the controlling device 30 to the network 2. The communication unit 308 exchanges various types of data, such as divided DCPs, via the network 2 with external apparatuses, such as the creating server 10.

The connection port 309 is a port for connecting the controlling device 30 to an external apparatus, such as the exhibition server 40. For example, the connection port 309 has a connection terminal such as a USB terminal or an IEEE 1394 terminal. By connecting the controlling device 30 to the exhibition server 40 via the connection port 309 and a wire cable, various types of data, such as DCPs or divided DCPs and control signals, can be exchanged between the controlling device 30 and the exhibition server 40.

Next, the configuration of the exhibition server 40 will be described. For example, as shown in FIG. 13, the exhibition server 40 includes a CPU 401, a main memory unit 402, an input unit 403, an output unit 404, a magnetic storage device 400, a picture decoding unit 406, a sound decoding unit 407, connection ports 408a to 408c, and a local bus 410 interconnecting these components. Of these components, the CPU 401, the main memory unit 402, the input unit 403, and the output unit 404 have substantially the same functions and configurations as the CPU 101, the main memory unit 102, the input unit 103, and the output unit 104 of the creating server 10 shown in FIG. 8, respectively, so that detailed description thereof will be omitted.

As described with reference to FIG. 12, the magnetic storage device 400 is formed of a RAID device or the like. The magnetic storage device 400 stores DCPs or divided DCPs ingested in the exhibition apparatus 20, in separate directories for individual digital cinemas.

The picture decoding unit 406 expands (decodes) picture data included in a DCP, compressed through encoding according to a predetermined compression encoding scheme (e.g., JPEG 2000). The sound decoding unit 407 expands (decodes) sound data included in a DCP, compressed through encoding according to a predetermined compression encoding scheme (e.g., WAV). Furthermore, the picture decoding unit 406 and the sound decoding unit 407 can decrypt encrypted picture data and sound data using key information provided from the creating server 10.

The connection ports 408a to 408c are ports for connecting the exhibition server 40 to external apparatuses, such as the controlling device 30, the projector 42, and the speaker 44. With the connection port 408a, various types of data, such as DCPs or divided DCPs and control signals, can be exchanged between the controlling device 30 and the exhibition server 40. Furthermore, picture data and sound data played by the exhibition server 40 can be output to the projector 42 and the speaker 44 via the connection ports 408a and 408b.

In the exhibition apparatus 20 configured as described above, it is possible to mount the removable recording medium 1 on the controlling device 30, read a DCP or divided DCPs from the removable recording medium 1 by the drive 307 of the controlling device 30, and ingest the DCP or divided DCPs in the magnetic storage device 400 of the exhibition server 40. Furthermore, with the communication unit 308 of the controlling device 30, it is possible to receive a DCP or divided DCPs from the creating server 10 via the network 2 and to ingest the DCP or divided DCPs in the magnetic storage device 400 of the exhibition server 40. Furthermore, the exhibition server 40 can exhibit a digital cinema by playing content files stored in the magnetic storage device 400.

In the example described with reference to FIGS. 12 and 13, the controlling device 30 and the exhibition server 40 are configured as separate devices. However, without limitation to this example, the controlling device 30 may be integrated with the exhibition server 40 in a single device. In this case, the drive 307 for the removable recording medium 1 and the communication unit 308 for the network 2 are provided in the exhibition server 40.

Figure 14:
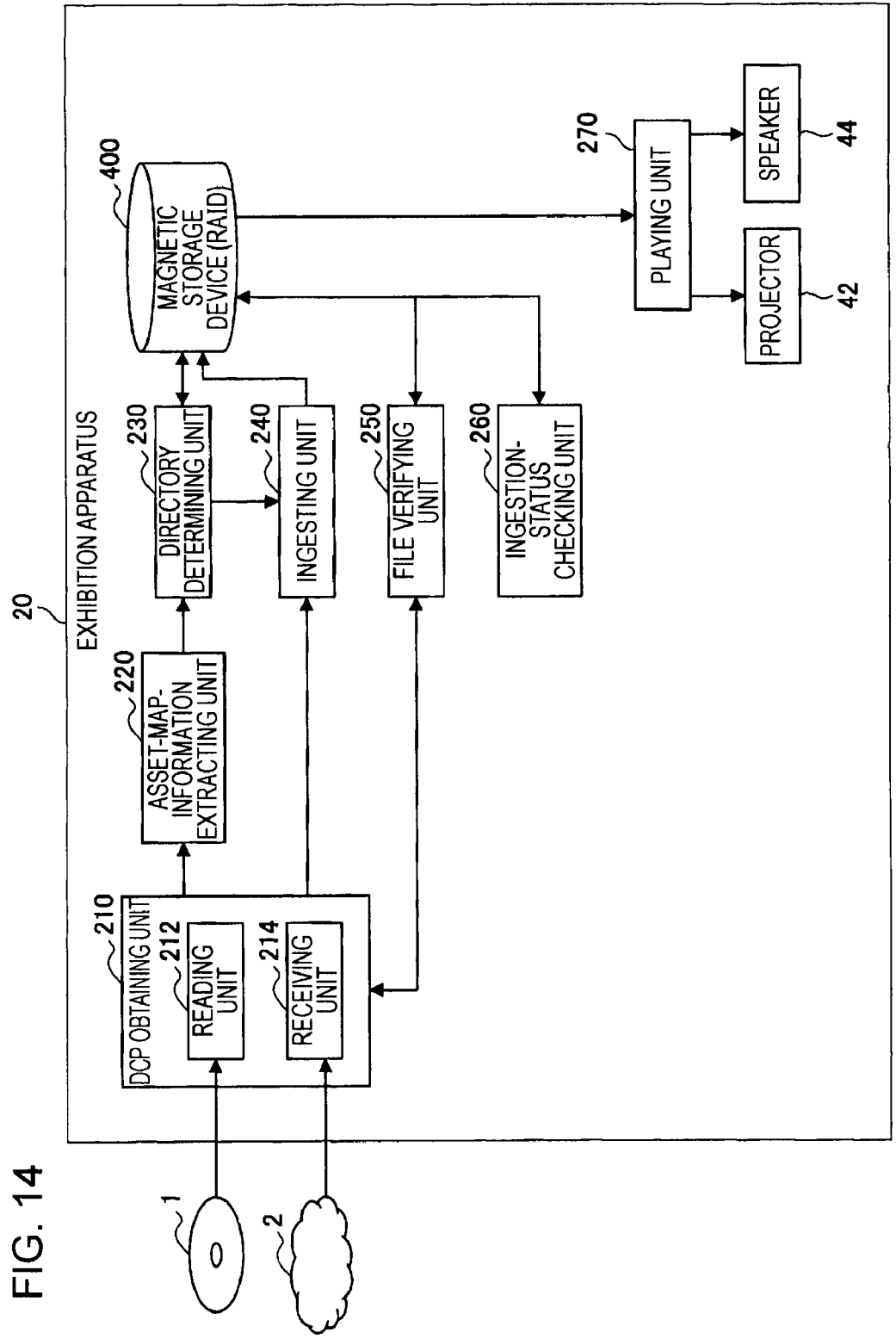
FIG. 14 is a diagram showing the functional configuration of the exhibition apparatus according to the embodiment.
Figure 15:
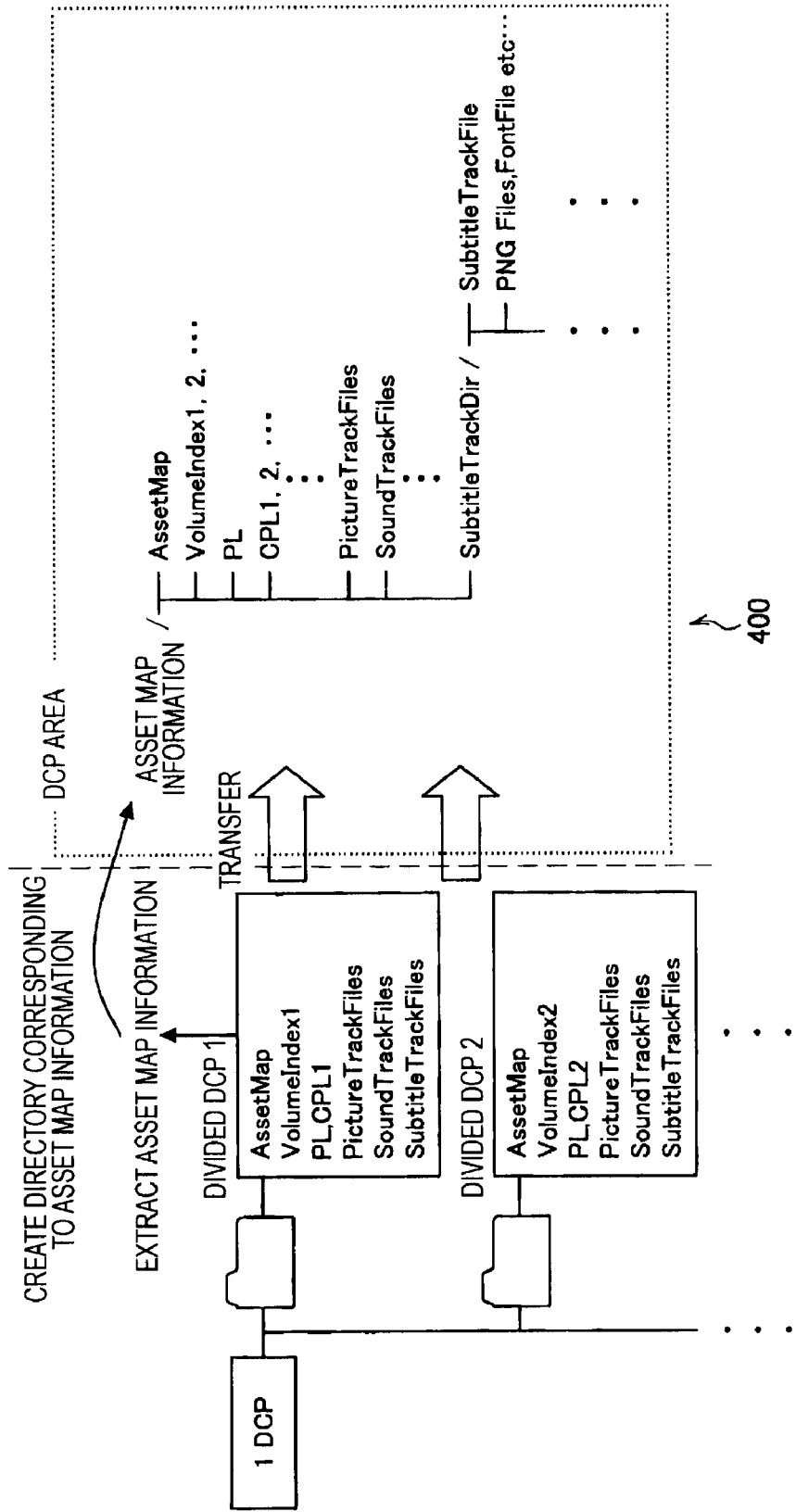
FIG. 15 is a diagram for explaining a method of ingestion in the exhibition apparatus according to the embodiment.
Figure 16:
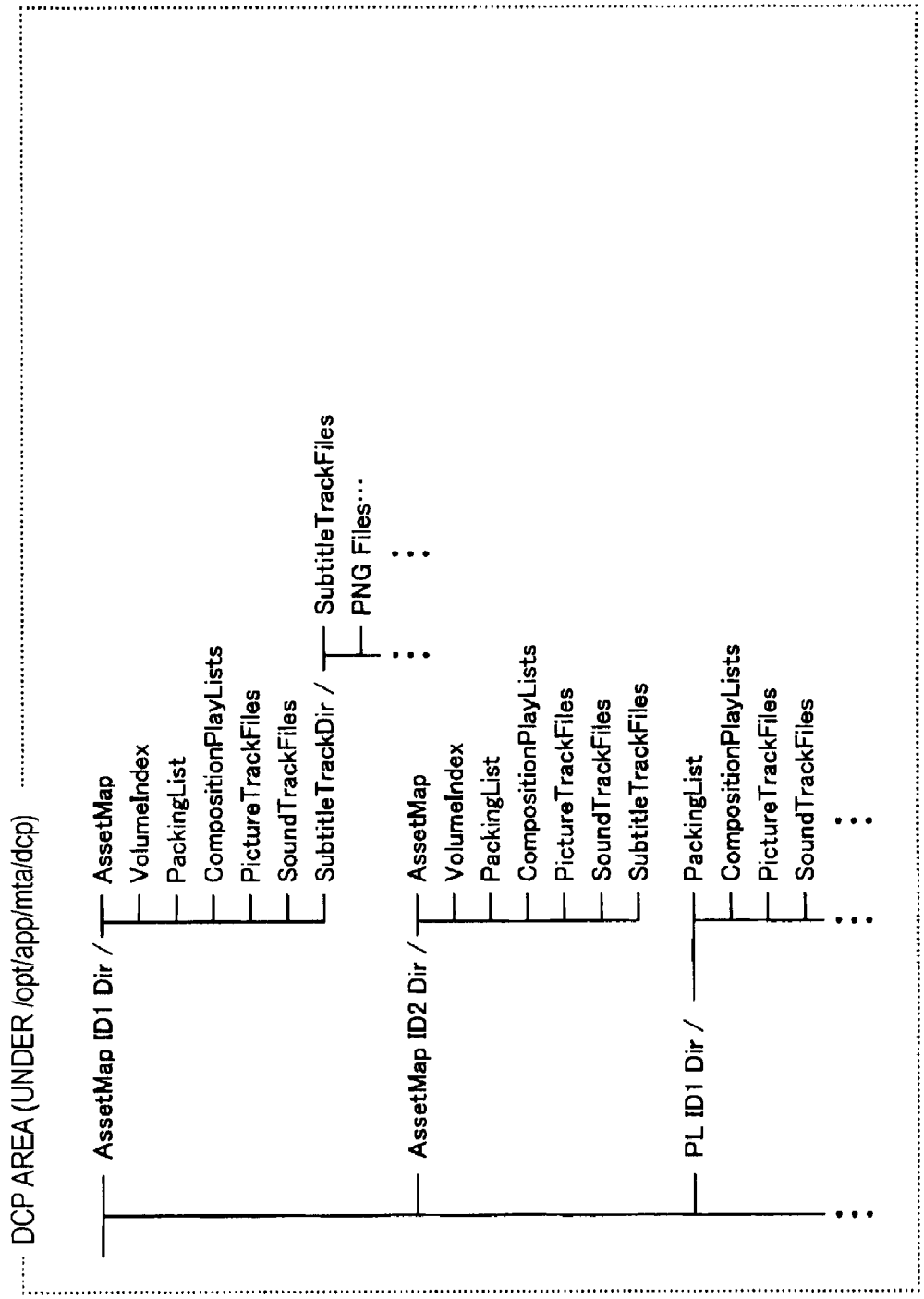
FIG. 16 is a schematic diagram showing a directory structure of a DCP area in a magnetic storage device according to the embodiment.

Next, the functional configuration of the exhibition apparatus 20 according to this embodiment will be described with reference to FIGS. 14 to 16. FIG. 14 is a diagram showing the functional configuration of the exhibition apparatus 20 according to this embodiment. FIG. 15 is a diagram for explaining a method of ingestion by the exhibition apparatus 20 according to this embodiment. FIG. 16 is a schematic diagram showing the directory structure in a DCP area in the magnetic storage device 400 according to this embodiment.

As shown in FIG. 14, the exhibition apparatus 20 includes a DCP obtaining unit 210, an asset-map-information extracting unit 220, a directory determining unit 230, an ingesting unit 240, a file verifying unit 250, an ingestion-status checking unit 260, and a playing unit 270.

The DCP obtaining unit 210 obtains a DCP or divided DCPs provided from the creating server 10 described earlier, as data to be ingested in the exhibition apparatus 20. If a plurality of divided DCPs have been created for one digital cinema, the DCP obtaining unit 210 may obtain all the divided DCPs or only some of the divided DCPs. Furthermore, the DCP obtaining unit 210 may obtain the divided DCPs simultaneously or obtain the divided DCPs individually and sequentially.

The DCP obtaining unit 210 obtains the DCP or divided DCPs created by the creating server 10 via the removable recording medium 1, the network 2, or the like. More specifically, the DCP obtaining unit 210 includes a reading unit 212 for obtaining a DCP or divided DCPs from the creating server 10 via the removable recording medium 1, and a receiving unit 214 for obtaining a DCP or divided DCPs from the creating server 10 via the network 2.

The reading unit 212 is formed of, for example, the drive 307 and the CPU 301 that controls the drive 307 in the controlling device 30 described earlier. The reading unit 212 reads a DCP or divided DCPs created by the creating server 10 from the removable recording medium 1 mounted on the exhibition apparatus 20. By using the removable recording medium 1, the exhibition apparatus 20 can obtain a DCP or divided DCPs having relatively large amount of data from the creating server 10.

The receiving unit 214 is formed of, for example, the communication unit 308 and the CPU 301 that controls the communication unit 308 in the controlling device 30. The receiving unit 214 receives a DCP or divided DCPs created by the creating server 10 from the creating server 10 via the network 2. By using such network transfer, the exhibition apparatus 20 can quickly and readily obtain a DCP or divided DCPs having a relatively small amount of data from the creating server 10. This is particularly beneficial in obtaining a divided DCP for a replacement version, which includes only management files such as a CPL and an asset map for the replacement version and does not include content files.

The asset-map-information extracting unit 220 extracts asset map information from the asset map included in a divided DCP to be ingested, obtained by the DCP obtaining unit 210, as shown in FIG. 15. The asset map information is unique to the asset map. As the asset map information, any type of information that is unique to the asset map can be used, such as identification information (e.g., a UUID) uniquely assigned to the asset map, or a hash value of the asset map. Each asset map has it unique asset map information, corresponding on a one-to-one basis, so that asset map information serves as identification information of an asset map and identification information of a digital cinema.

As described earlier, when a plurality of divided DCPs are created for one digital cinema, the same asset map is commonly included in all the divided DCPs. That is, an asset map is created for each digital cinema. In the case of the example shown in FIG. 15, since two divided DCPs 1 and 2 are divided DCPs for the same digital cinema, the divided DCPs 1 and 2 include the same asset map, and the asset map information is the same. Since asset map information, which is unique to an asset map, is also unique to a digital cinema, asset map information corresponds to a digital cinema on a one-to-one basis. Accordingly, on the basis of the asset map information, it is possible to determine a digital cinema to which the divided DCP to be ingested belongs.

Thus, upon receiving an ingestion instruction, the asset-map-information extracting unit 220 picks up the asset map from the divided DCP to be ingested, and extracts asset map information (e.g., a UUID) described in the asset map.

On the basis of the asset map information extracted from the divided DCP to be ingested, the directory determining unit 230 determines a directory in a DCP storage area of the magnetic storage device 400 in which the divided DCP is to be ingested. As shown in FIGS. 15 and 16, in the DCP storage area of the magnetic storage device 400, directories for separately storing DCPs are created on a per-asset-map-information basis (i.e., on a per-digital-cinema basis). The directory determining unit 230 determines a directory for ingestion so that one or more divided DCPs for the same digital cinema are ingested in the same directory.

At this time, the directory determining unit 230 checks whether a directory corresponding to the extracted asset map information already exists in the DCP area of the magnetic storage device 400. If the directory already exists (i.e., if the directory was previously created at the time of ingestion of another divided DCP), the directory determining unit 230 determines the existing directory as the directory in which the divided DCP is to be ingested. On the other hand, if the directory does not exist (i.e., if the directory has not been created), the directory determining unit 230 newly creates a directory corresponding to the extracted asset map information in the DCP area, and determines the newly created directory as the directory where the divided DCP is to be ingested. As described above, the directory determining unit 230 also has a function of managing (adding, deleting, and so forth) directories provided on a per-asset-map-information basis in the DCP storage area of the magnetic storage device 400.

The ingesting unit 240 ingests files in the divided DCP to be ingested in the ingestion destination directory of the magnetic storage device 400 determined by the directory determining unit 230. The ingestion refers to inputting a divided DCP obtained from an external apparatus into the exhibition server 40 in such a form that the exhibition server 40 can use the divided DCP. The ingesting unit 240 copies the files in the divided DCP to be ingested in the ingestion destination directory of the magnetic storage device 400.

At this time, the ingesting unit 240 copies files that do not exist in the ingestion destination directory, and do not copy files existing in the directory. For example, referring to FIG. 15, in a case where the divided DCP 2 is ingested after the divided DCP 1 is ingested, the asset map and PL already exist in the directory since these were copied at the time of ingestion of the divided DCP 1, so that these are not copied at the time of ingestion of the divided DCP 2. As for VIs, since VIs of divided DCPs have the same file name (although data in the individual VIs differ since serial numbers are included), the file names of the VIs may be changed at the time of ingestion (e.g., by adding identifiers such as "1", "2", "3", ... at the ends of the file names) so that the file names of the VIs of the individual divided DCPs differ.

As described above, according to this embodiment, asset map information is extracted from a DCP to be ingested and is reported to an ingestion target. At the ingestion target, a directory corresponding to the asset map information is created, and files in the DCP are ingested in the directory. If a single parent DCP has been divided into a plurality of divided DCPs, the ingesting process described above is executed for each of the divided DCPs, i.e., the ingesting process is executed a number of times corresponding to the division number. Divided DCPs for the same digital cinema are ingested in the same directory since the divided DCPs include the same asset map.

In the case of the example shown in FIG. 15, the divided DCPs 1 and 2 belonging to the same digital cinema are ingested in the same directory. In the example shown in FIG. 16, three directories corresponding to three digital cinemas are created in the DCP area of the magnetic storage device 400. "AssetMap ID1 Dir/" and "AssetMap ID2 Dir/" denote directories created on a per-asset-map-UUID basis, and "PL ID1 Dir/" denotes a directory created on a per-PL-UUID basis. In each of "AssetMap ID1 Dir/" and "AssetMap ID2 Dir/", all the divided DCPs including an asset map having the corresponding UUID are ingested. Furthermore, when a DCP not including any asset map is ingested, instead of the asset map, unique information (e.g., a UUID of PL) is extracted from a PL, which exists in every DCP, and a directory "PL ID1 Dir/" is created on a per-PL-unique-information basis. In "PL ID1 Dir", files of an undivided DCP are ingested, and divided DCPs including an asset map are not ingested.

By ingesting all the divided DCPs belonging to the same digital cinema by the ingesting method described above, it is possible to collect all the files in the divided DCPs in the same directory and to restore the files into an original state before division (the file structure of the parent DCP) Furthermore, by determining a directory on the basis of asset map information as described above, without the user specifying an ingestion destination directory, when a plurality of divided DCPs belonging to the same digital cinema are ingested, the divided DCPs are automatically saved in the same directory. This reduces the load of user's operation.

The file verifying unit 250 verifies the integrity of individual files in the divided DCPs on the basis of hash values described in the PL included in each of the divided DCPs. In this embodiment, the PL is included in all the divided DCPs as well as in the main divided DCP. Thus, by obtaining one divided DCP, it is possible to verify the integrity of the individual files in the divided DCP using the PL in the divided DCP. The verification of the integrity of files refers to checking whether data of content files, such as picture files, have not been corrupted due to some reason or modified from the original data.

The file verifying unit 250 calculates a hash value for each file in the divided DCP, and compares the hash value with the hash value of the file described in advance in the PL. If these hash values match, the file verifying unit 250 determines that the file maintains its integrity without being corrupted. On the other hand, if these hash values do not match, the file verifying unit 250 determines that the file has been corrupted and has lost its integrity, and issues an error message. The verification of the integrity of files may be executed on the files in a divided DCP before ingestion upon obtaining the divided DCP, or on the files stored in the magnetic storage device 400 after ingestion of a divided DCP.

The ingestion-status checking unit 260 checks the ingestion status of a plurality of divided DCPs belonging to each digital cinema, on the basis of the division number information included in an ingested asset map. As described earlier, the asset map describes division number information representing the total number of divided DCPs created for one digital cinema, and index information of divided DCPs including individual files. Thus, with reference to the asset map, it is possible to check the ingestion status, such as whether all the divided DCPs belonging to each digital cinema have been ingested, or the total number of divided DCPs that have been ingested.

For example, if a digital cinema has been divided into 10 divided DCPs, "10" is described as division number information in the asset map, and "1" to "10" are described as division index information individually in the VIs of the ten divided DCPs. A case will be considered where the divided DCPs with the division index information of "1" and "3" among the ten divided DCPs have been ingested in the exhibition apparatus 20. In this case, the ingestion-status checking unit 260 searches the asset map and VIs in the directory in the magnetic storage device 400, and with reference to the division number information "10" included in the asset map and the division index information "1" and "3" included in the VIs, determines that two among ten divided DCPs have already been ingested and the other divided DCPs have not yet been ingested.

The playing unit 270 is formed of, for example, the picture encoding unit 106, the sound encoding unit 107, and the CPU 101 controlling the picture encoding unit 106 and the sound encoding unit 107. The playing unit 270 plays content files stored in the magnetic storage device 400 according to a CPL to output picture files and subtitle files to the projector 42 and to output sound files to the speaker 44. As described earlier, when one or more divided DCPs are ingested in the magnetic storage device 400 of the exhibition apparatus 20, the files (CPLs, content files, etc.) included in the ingested divided DCPs are copied to the magnetic storage device 400. According to a CPL stored in the magnetic storage device 400, the playing unit 270 plays content files (picture track files, sound track files, and/or subtitle track files) of an exhibition version corresponding to the CPL.

As described above, according to this embodiment, DCPs can be divided on a per-CPL basis (on a per-exhibition-version basis), with each divided DCP including a CPL and content files associated by the CPL. In this case, a complete playing operation can be performed with the files in each divided DCP. That is, an exhibition version of a digital cinema can be played by playing content files included in a divided DCP according to a CPL included in the divided DCP. Thus, even if all the divided DCPs belonging to a digital cinema have not been ingested in the exhibition apparatus 20, by ingesting a divided DCP, the playing unit 270 can play the divided DCP independently.

Furthermore, a case will be considered where, referring to FIG. 5, the divided DCP 2 for the Japanese version is ingested after ingesting the divided DCP 1 for the English version, and the Japanese version of the digital cinema is played. In this case, English picture files associated by the CPLs 2 and 3 for Japanese versions are not included in the divided DCP 2 for the Japanese version. Instead, the English picture files included in the divided DCP 1 ingested earlier are stored in the magnetic storage device 400. Thus, the playing unit 270 can play the English picture files and the Japanese sound files (or the English picture files, the English sound files, and the Japanese subtitle files) stored in the magnetic storage device 400, using the CPL 2 or 3 stored in the magnetic storage device 400.

8. Method of Ingesting DCP

Figure 17:
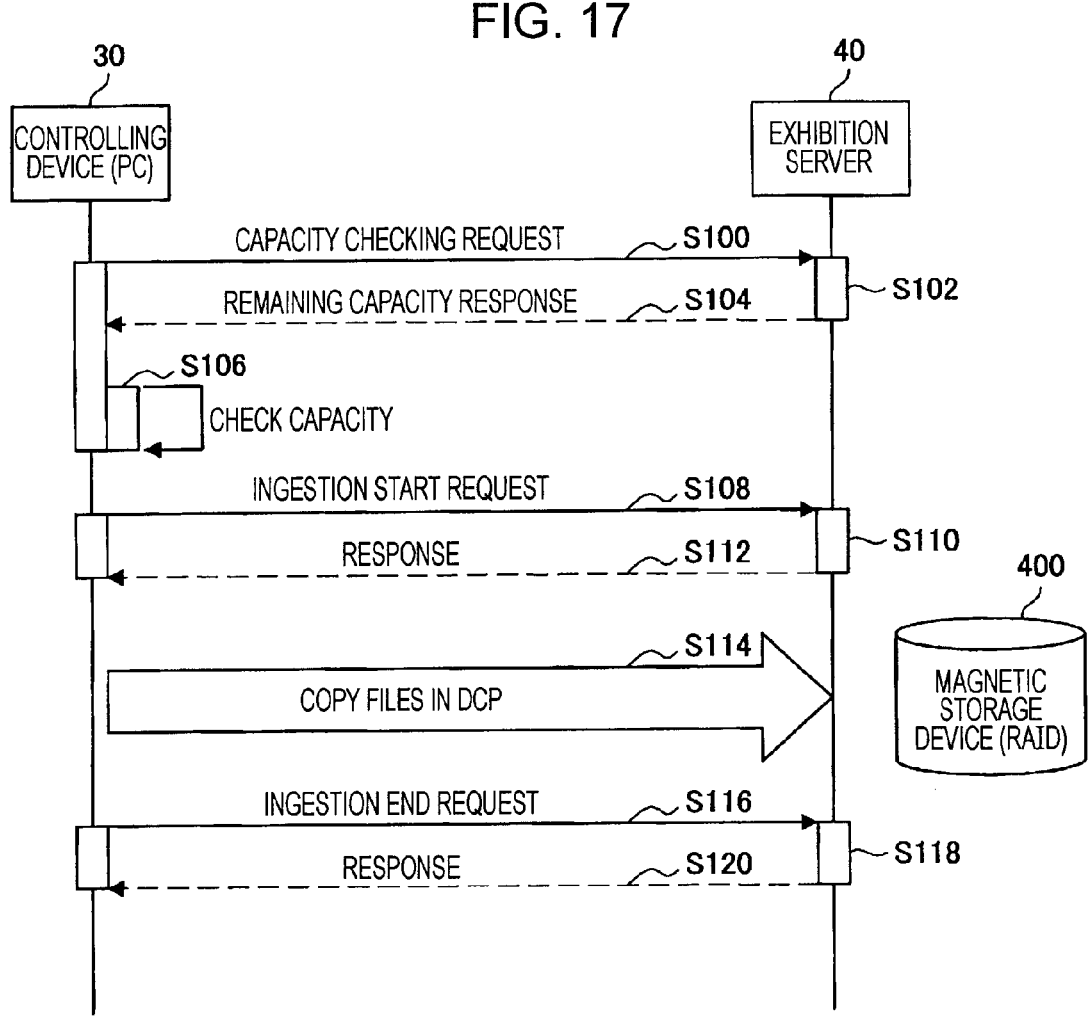
FIG. 17 is a diagram showing a sequence of operations executed by the controlling device and the exhibition server in the exhibition apparatus at the time of ingestion according to the embodiment.

Next, a method of ingesting divided DCPs in the exhibition apparatus 20 will be described. FIG. 17 is a sequence diagram of operations executed by the controlling device 30 and the exhibition server 40 of the exhibition apparatus 20 at the time of ingestion according to this embodiment.

As shown in FIG. 17, upon receiving an instruction for ingesting a divided DCP from the user, the controlling device 30 first sends a capacity checking request for checking the remaining capacity of the magnetic storage device 400 to the exhibition server 40 (step S100). Upon receiving the capacity checking request, the exhibition server 40 checks the remaining capacity of the magnetic storage device 400 (step S102), and returns a response including information representing the remaining capacity to the controlling device 30 (step S104). Upon receiving the response, the controlling device 30 checks whether the magnetic storage device 400 has a sufficient remaining capacity for storing the divided DCP to be ingested (step S106). If the remaining capacity is not sufficient, the controlling device 30 issues an error message indicating that the remaining capacity is not sufficient.

If the remaining capacity is sufficient, the controlling device 30 sends an ingestion start request to the exhibition server 40 (step S108). Upon receiving the ingestion start request, the exhibition server 40 performs an exclusive control operation for ingesting the divided DCP (step S110), and then returns a response indicating completion of the exclusive control to the controlling device 30 (step S112). From step S110 to step S114, in which an ingestion end request is received, the exhibition server 40 locks operations for reading data from the magnetic storage device 400 and writing data to the magnetic storage device 400 so that files of the divided DCP can be ingested properly.

Then, upon receiving the response indicating completion of the exclusive control, the controlling device 30 starts an ingestion process to copy the files in the divided DCP to the magnetic storage device 400 (step S114). At this time, asset map information is extracted from the asset map in the divided DCP, and the files in the divided DCP are copied to a directory corresponding to the asset map information.

Then, upon completion of the ingestion process, the controlling device 30 sends an ingestion end request to the exhibition server 40 (step S116). Upon receiving the ingestion end request, the exhibition server 40 unlocks the magnetic storage device 400 (step S118), and then returns a response indicating that the exhibition server 40 has been unlocked to the controlling device 30 (step S120).

By controlling the exhibition server 40 using the controlling device 30 as described above, the divided DCP to be ingested can be ingested properly in the magnetic storage device 400 of the exhibition server 40.

Figure 18:
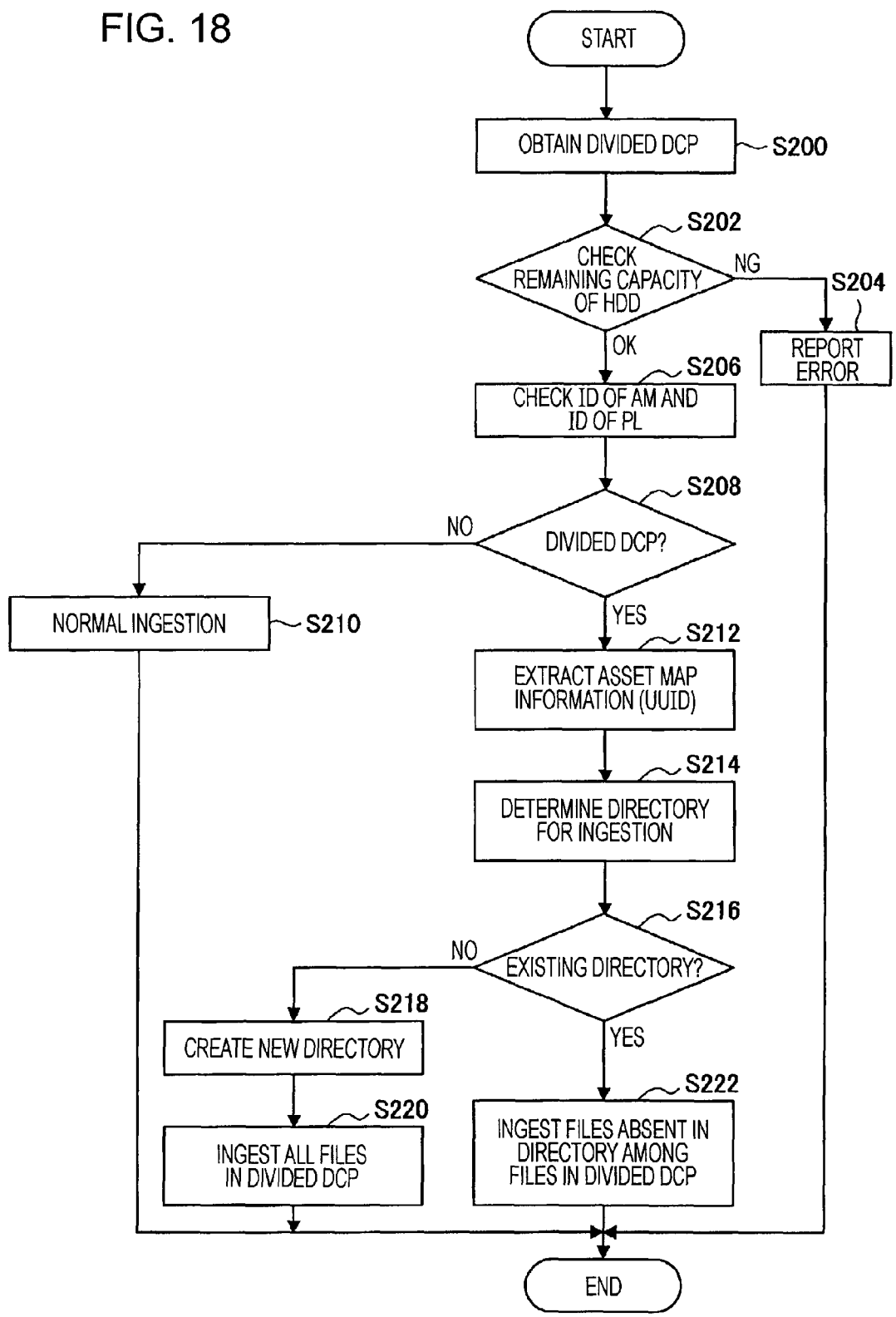
FIG. 18 is a flowchart showing a method of ingestion in the exhibition apparatus according to the embodiment.

Next, an operation flow of the exhibition apparatus 20 as a whole in the ingestion process will be described. FIG. 18 is a flowchart showing the ingestion process executed by the exhibition apparatus 20 according to this embodiment.

As shown in FIG. 18, the exhibition apparatus 20 first obtains one or more DCPs or divided DCPs created by the creating server 10, via the removable recording medium 1 or the network 2 (step S200: DCP obtaining step). The DCPS or divided DCPs are to be ingested in the exhibition apparatus 20. Then, the exhibition apparatus 20 checks whether the magnetic storage device 400 at the ingestion destination has a sufficient remaining capacity for storing the DCPs or divided DCPs to be ingested (step S202). If the remaining capacity is not sufficient, the exhibition apparatus 20 issues an error message indicating that the remaining capacity is not sufficient (step S204). On the other hand, if the remaining capacity is sufficient, the exhibition apparatus 20 executes an ingestion process described below.

First, the exhibition apparatus 20 checks the UUID of the asset map or the UUID of the PL included in each of the DCPs or divided DCPs to be ingested (step S206). If the data to be ingested is a DCP or a divided DCP, an asset map or PL is included in the data. Thus, by checking the ID of the asset map or PL, the exhibition apparatus 20 can check whether the data to be ingested is a DCP or divided DCP of a digital cinema conforming to the DCI standard.

Then, on the basis of management files included in the data to be ingested, the exhibition apparatus 20 determines whether the data to be ingested is an ordinary undivided DCP or a divided DCP (step S208). This can be determined by checking, for example, information described in the asset map (e.g., division number information) or division index information described in the VI. If it is determined that the data to be ingested is an ordinary undivided DCP, the DCP is ingested in the magnetic storage device 400 by an ordinary ingestion method (step S210).

On the other hand, if the data to be ingested is a divided DCP, the exhibition apparatus 20 extracts the asset map information described earlier (e.g., the UUID of the asset map) from the asset map included in the divided DCP to be ingested (step S212: asset-map-information extracting step). Then, on the basis of the extracted asset map information, the exhibition apparatus 20 determines a digital cinema relevant to the divided DCP to be ingested, and determines a directory corresponding to the asset map information as an ingestion destination directory in the magnetic storage device 400 (step S216: directory determining step).

Furthermore, the exhibition apparatus 20 checks whether the directory corresponding to the asset map information exists in the DCP storage area of the magnetic storage device 400 (step S216). If the directory corresponding to the asset map information does not exist, the exhibition apparatus 20 newly creates the directory (step S218), and copies all the files of the divided DCP in the directory (step S220: ingesting step).

On the other hand, if it is determined in step S216 that the directory corresponding to the asset map information already exists in the magnetic storage device 400, of the files in the divided DCPs to be ingested, the exhibition apparatus 20 copies files that do not exist in the existing directory to the directory (step S222: ingesting step).

By the ingestion method described above, the exhibition apparatus 20 can ingest divided DCPs. Thus, it becomes possible to divided digital cinema content of a large volume into divided DCPs at the creating server 10 and to ingest the divided DCPs in the exhibition apparatus 20. At this time, at the exhibition apparatus 20, various divided DCPs for various digital cinemas can be ingested in separate directories of the magnetic storage device 400 on a per-digital-cinema basis. At this time, an ingestion destination directory can be determined automatically on the basis of asset map information extracted from a divided DCP, so that the user does not have to grasp the content of the divided DCP. Thus, it is possible to ingest a divided DCP readily, quickly, and properly.

9. Method of Playing Digital Cinema

Figure 19:
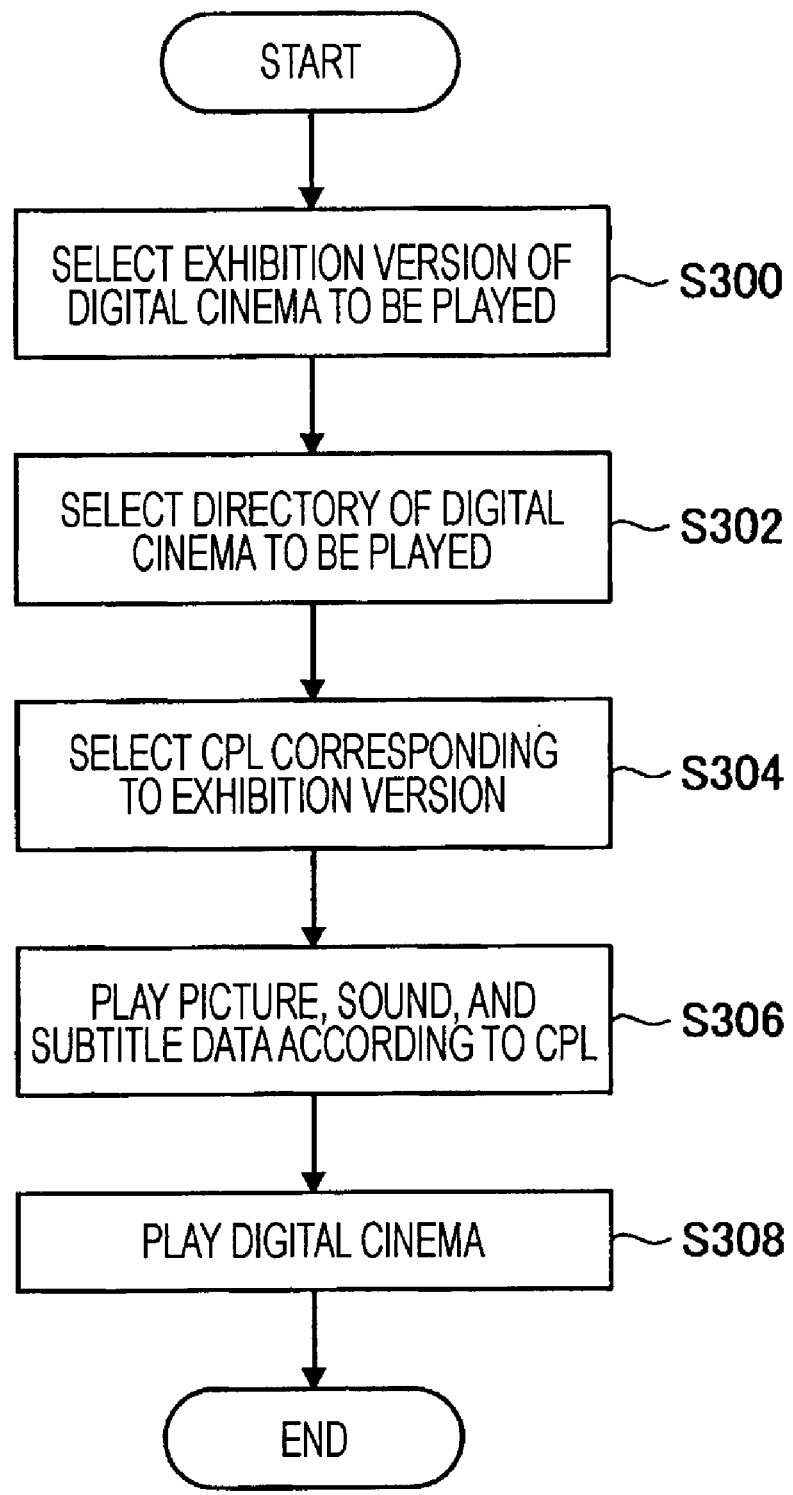
FIG. 19 is a flowchart showing a method of playing digital cinema content according to the embodiment.

Next, a method of playing digital cinema content at the exhibition apparatus 20 will be described with reference to FIG. 19. FIG. 19 is a flowchart showing a method of playing digital cinema content according to this embodiment. It is assumed herein that, before the flow described below is executed, by ingesting a plurality of divided DCPs for a digital cinema in the exhibition apparatus 20, CPLs and content files corresponding to a plurality of exhibition versions have been stored in advance in the magnetic storage device 400.

As shown in FIG. 19, for example, on the basis of user input, the exhibition apparatus 20 first selects a digital cinema to be played and an exhibition version thereof (step S300). Then, the exhibition apparatus 20 selects a directory corresponding to the selected digital cinema from a plurality of directories in the magnetic storage device 400 (step S302). Furthermore, the exhibition apparatus 20 selects a CPL corresponding to the selected exhibition version from a plurality of CPLs in the directory (step S304).

Then, according to the CPL selected in step S304, the exhibition apparatus 20 plays content files (picture files, sound files, and subtitle files) of the exhibition version corresponding to the CPL (step S306: playing step). More specifically, the exhibition apparatus 20 reads the selected CPL from the magnetic storage device 400, interprets description in the CPL, and reads content files (picture files, sound files, and subtitle files) associated by the CPL from the magnetic storage device 400. In the CPL, the entry points and durations of individual content files are described on a per-reel basis. According to the information of the entry points and durations described in the CPL, the exhibition apparatus 20 sequentially decodes data of the content files on a per-reel basis to convert the data into formats compatible with the projector 42 or the speaker 44. Furthermore, the exhibition apparatus 20 outputs the resulting picture, sound and subtitle data to the projector 42 and the speaker 44, whereby the digital cinema is exhibited (step S308).

According to the digital cinema playing method described above, after divided DCPs for individual exhibition versions have been ingested in the magnetic storage device 400, the exhibition apparatus 20 can properly play digital cinema content stored in the magnetic storage device 400, according to any one of the CPLs for the individual exhibition versions. Furthermore, even when divided DCPs for all the exhibition versions have not been ingested in the magnetic storage device 400 and only some of the divided DCPs have been ingested, using CPLs included in the ingested divided DCPS, it is possible to play the exhibition versions of the digital cinema corresponding to the CPL.

Next, a procedure of additionally creating and distributing a different language version or replacement version of a digital cinema after distributing an original version of the digital cinema will be described with reference to FIG. 20.

As shown in FIG. 20, at the creating server 10 of a distribution company, a DCP for an original version of a digital cinema is created (step S400). Then, divided DCPs for the original version are distributed from the creating server 10 to the exhibition apparatus 20 of each theater (step S402), and ingested in the magnetic storage device 400 of the exhibition apparatus 20 (step S404). The divided DCPs for the original version include content files of the original version, and a CPL associating the content files of the original version. The exhibition apparatus 20 plays the content files of the original version using the CPL for the original version, whereby the original version of the digital cinema is played (step S406).

In some cases, after the distribution and exhibition of the original version of the digital cinema, a different language version or replacement version of the digital cinema is created. For example, a different language version is created for the purpose of exhibition in a country other than the country where the original version was exhibited. As another example, a replacement version is created in order to replace, add, or modify scenes for the purpose of compliance with a regulation in a country or region where the cinema is to be exhibited or for the purpose of advertisement of a company.

In this case, the creating server 10 of the distribution company additionally creates divided DCPs including a CPL and content files of the different language version or replacement version (step S408), distributes the divided DCPs for the different language version or replacement version from the creating server 10 to the exhibition apparatus 20 of each theater (step S410), and additionally ingests the divided DCPs in the magnetic storage device 400 of the exhibition apparatus 20 (step S412). Thus, the exhibition apparatus 20 can play the content files of the different language version or replacement version using the CPL for the different language version or replacement version, whereby the different language version or replacement version of the digital cinema is played (step S414).

As described above, according to this embodiment, by using divided DCPs, it is readily possible to additionally create and distribute a version of a digital cinema that is different from an original version of the digital cinema. This allows flexible creation of a different language version or replacement of scenes. Furthermore, the divided DCPs for the different version suffice to include content files corresponding to differences between the original version and the different version, and content files that are common with the original version need not be included. Thus, the amount of data of divided DCPs can be reduced, so that the data can be distributed readily and safely.

10. Advantages

The digital cinema system according to this embodiment, the creating server 10 and the exhibition apparatus 20 constituting the digital cinema system, and processing executed in the digital cinema system have been described above in detail. According to this embodiment, by dividing the DCP into a plurality of divided DCPs on a per-exhibition-version basis and distributing the divided DCPs, it is possible to ingest digital cinema content having a large volume in the exhibition apparatus 20 in divided forms. At this time, it is possible to automatically ingest divided DCPs for various digital cinemas separately in directories for the individual digital cinemas. Thus, in contrast to the related art, the user need not manually integrate DCPs before ingestion, and ingestion can be executed readily and properly. This serves to improve convenience for the user. Furthermore, since it is not necessary to integrate a plurality of divided DCPs in advance before ingestion, the storage capacity of the magnetic storage device 400 used for ingestion can be reduced. Furthermore, without limitation to divided DCPs of the format described earlier, ordinary DCPs or digital cinema content in other formats can be ingested in the exhibition apparatus 20.

Furthermore, by including a CPL and associated content files corresponding to at least one exhibition version in each divided DCP, even if all the divided DCPs have not been ingested in the exhibition apparatus 20, it is possible to play an exhibition version corresponding to a divided DCP that has already been ingested.

Furthermore, by using divided DCPs having the format described earlier, a digital cinema can be divided efficiently. This serves to facilitate operations for dealing with digital cinema content. Furthermore, by creating divided DCPs on a per-language-version basis, for example, it becomes readily possible to add an available language version afterward. Furthermore, by creating divided DCPs for an original version and a replacement version, for example, it becomes readily possible to localize a digital cinema or to replace scenes of advertisement.

Although a preferred embodiment of the present invention has been described above with reference to the accompanying drawings, obviously, the present invention is not limited to the embodiment. It should be understood by those skilled in the art that various modifications, combinations, sub-combinations and alterations may occur depending on design requirements and other factors insofar as they are within the scope of the appended claims or the equivalents thereof, and that such modifications, combinations, sub-combinations and alterations fall within the scope of the present invention.

What is claimed is:

1. A digital-cinema processing apparatus for ingesting a digital cinema package (DCP) related to specifications including color space conversion, compression, and encryption for copyright protection in a storage device, the digital-cinema processing apparatus comprising:

a controller configured to make an ingestion request;

a DCP obtaining unit configured to obtain at least one divided DCP as a divided DCP to be ingested among a plurality of divided DCPs including a common asset map corresponding to a digital cinema, the plurality of divided DCPs having allocated thereto one or more picture track files, sound track files, and/or subtitle track files for the digital cinema, one of the plurality of divided DCPs including an original version of the digital cinema, and another of the plurality of divided DCPs including an alternate version of the digital cinema and including only a content file that corresponds to a difference between the original version and the alternate version of the digital cinema;

an asset-map-information extracting unit configured to extract asset map information from the asset map included in the divided DCP to be ingested, the asset map information being information unique to the asset map;

a directory determining unit configured to determine an ingestion destination directory for the divided DCP to be ingested in the storage device on the basis of the asset map information; and an ingesting unit configured to ingest the divided DCP to be ingested in the ingestion destination directory of the storage device, wherein, the controller issues a capacity check request to the ingestion unit to verify whether the ingested data of the divided DCP does not exceed an available memory space of the storage device, and after the ingestion unit has verified that there is sufficient memory space in the storage device, the controller issues the ingestion request to the ingestion unit, and the ingestion unit locks operations for reading data from and writing data to the storage device during the ingestion of the divided DCP, and issues a response to the controller upon completion of the ingestion.

2. The digital-cinema processing apparatus according to claim 1, wherein the directory determining unit is configured to check whether a directory corresponding to the asset map information already exists in the storage device, to determine the existing directory as the ingestion destination directory if the directory exists, and to newly create a directory corresponding to the asset map information as the ingestion destination directory if the directory does not exist.

3. The digital-cinema processing apparatus according to claim 1, wherein the asset map information is identification information of the asset map or a hash value of the asset map.

4. The digital-cinema processing apparatus according to claim 1, further comprising:
   a playing unit configured to play one or more picture track files, sound track files, and/or subtitle track files in the directory in which the divided DCP has been ingested, wherein,
   the divided DCP further includes a composition playlist (CPL) corresponding to an exhibition version of the digital cinema and associating one or more picture track files, sound track files, and/or subtitle files allocated to the divided DCP, and
   the playing unit is configured to play the picture track files, sound track files, and/or subtitle track files according to the CPL in the directory in which the divided DCP has been ingested.

5. The digital-cinema processing apparatus according to claim 1, further comprising:
   a file verifying unit configured to verify integrity of each file in the divided DCP, wherein,
   each of the divided DCPs further includes a common packing list (PL) corresponding to the digital cinema, and
   the file verifying unit is configured to verify the integrity of each file on the basis of a hash value described in the PL.

6. The digital-cinema processing apparatus according to claim 1, further comprising:
   an ingestion-status checking unit configured to check ingestion status of the plurality of divided DCPs, wherein,
   the asset map includes division number information representing the total number of the plurality of divided DCPs created for the digital cinema, and
   the ingestion-status checking unit is configured to check the ingestion status on the basis of the division number information included in the asset map.

7. A method of ingesting a digital cinema package (DCP) related to specifications including color space conversion, compression, and encryption for copyright protection in a storage device, the method comprising the steps of:
   obtaining at least one divided DCP as a divided DCP to be ingested among a plurality of divided DCPs including a common asset map corresponding to a digital cinema, the plurality of divided DCPs having allocated thereto one or more picture track files, sound track files, and/or subtitle track files for the digital cinema, one of the plurality of divided DCPs including an original version of the digital cinema, and another of the plurality of divided DCPs including an alternate version of the digital cinema and including only a content file that corresponds to a difference between the original version and the alternate version of the digital cinema;
   extracting asset map information from the asset map included in the divided DCP to be ingested, the asset map information being information unique to the asset map;
   determining an ingestion destination directory for the divided DCP to be ingested in the storage device on the basis of the asset map information;
   verifying whether the ingested data of the divided DCP does not exceed an available memory space of the storage device by a controller;
   issuing an ingestion request from the controller to an ingestion unit after the verifying step has confirmed that there is sufficient memory space in the storage device;
   ingesting the divided DCP to be ingested in the ingestion destination directory of the storage device and locking operations for reading data from and writing data to the storage device during the ingestion of the divided DCP by the ingestion unit; and
   issuing a response to the controller upon completion of the ingesting step.

8. A non-transitory computer readable medium including computer executable instructions, wherein the instructions, when executed by a computer, cause the computer to perform a method for ingesting a digital cinema package (DCP) related to specifications including color space conversion, compression, and encryption for copyright protection in a storage device, the method comprising:
   making, by a controlling unit, an ingestion request;
   obtaining, by a DCP obtaining unit, at least one divided DCP as a divided DCP to be ingested among a plurality of divided DCPs including a common asset map corresponding to a digital cinema, the plurality of divided DCPs having allocated thereto one or more picture track files, sound track files, and/or subtitle track files for the digital cinema, one of the plurality of divided DCPs including an original version of the digital cinema, and another of the plurality of divided DCPs including an alternate version of the digital cinema and including only a content file that corresponds to a difference between the original version and the alternate version of the digital cinema;
   extracting, by an asset-map-information extracting unit, asset map information from the asset map included in the divided DCP to be ingested, the asset map information being information unique to the asset map;
   determining, by a directory determining unit, an ingestion destination directory for the divided DCP to be ingested in the storage device on the basis of the asset map information;
   ingesting, by an ingesting unit, the divided DCP to be ingested in the ingestion destination directory of the storage device;
   issuing, by the controlling unit, a capacity check request to the ingestion unit to verify whether the ingested data of the divided DCP does not exceed an available memory space of the storage device, and after the ingestion unit has verified that there is sufficient memory space in the storage device, issuing, by the controlling unit, the ingestion request to the ingestion unit; and
   locking, by the ingestion unit leeks operations for reading data from and writing data to the storage device during the ingestion of the divided DCP, and issuing a response to the controlling unit upon completion of the ingestion.

9. The digital-cinema processing apparatus according to claim 1, wherein after the ingestion unit confirms that the ingested data of the divided DCP exceeds an available memory space of the storage device, the controller issues an error message indicating that the available memory space is insufficient.

10. The method of ingesting a digital cinema package according to claim 7, further comprising:

issuing an error message indicating that the available memory space is insufficient by the controller, after the verifying confirms that the ingested data of the divided DCP exceeds an available memory space of the storage device.

11. The non-transitory computer readable medium according to claim 8, wherein the method further comprises:

issuing an error message indicating that the available memory space is insufficient by the controller, after the verifying confirms that the ingested data of the divided DCP exceeds an available memory space of the storage device.

12. The digital-cinema processing apparatus according to claim 1, wherein each of the plurality of divided DCPs corresponds to a different version of the digital cinema.

13. The digital-cinema processing apparatus according to claim 1, wherein the another of the plurality of divided DCPs includes the alternate version of the digital cinema, without including an image file.

* * * * *